(12) United States Patent
Yamana et al.

(10) Patent No.: US 7,042,950 B2
(45) Date of Patent: May 9, 2006

(54) MULTICHANNEL VIDEO PROCESSING UNIT AND METHOD

(75) Inventors: Akifumi Yamana, Hyogo (JP); Toshiaki Tsuji, Hyogo (JP); Hideki Ishii, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 626 days.

(21) Appl. No.: 10/292,535

(22) Filed: Nov. 13, 2002

(65) Prior Publication Data

US 2003/0091115 A1   May 15, 2003

(30) Foreign Application Priority Data

Nov. 14, 2001  (JP) ............................. 2001-348523

(51) Int. Cl.
*H04B 1/66*  (2006.01)

(52) U.S. Cl. ................................................. 375/240.29

(58) Field of Classification Search ........... 375/240.21, 375/240.22, 240.24, 240.29, 240.26; H04B 1/66
See application file for complete search history.

(56) References Cited

U.S. PATENT DOCUMENTS

| | | | |
|---|---|---|---|
| 5,459,514 A * | 10/1995 | Sakamoto et al. | 375/240.11 |
| 5,485,215 A * | 1/1996 | Meyer et al. | 348/423.1 |
| 5,877,817 A | 3/1999 | Moon | |
| 5,926,791 A * | 7/1999 | Ogata et al. | 704/500 |
| 6,252,906 B1 | 6/2001 | Canfield | |
| 6,590,615 B1 * | 7/2003 | Murakami et al. | 348/555 |
| 2001/0007576 A1 | 7/2001 | Lyu | |
| 2001/0009568 A1 | 7/2001 | Haneda | |

FOREIGN PATENT DOCUMENTS

| | | |
|---|---|---|
| CN | 1309868 A | 8/2001 |
| JP | 06-006720 | 1/1994 |
| JP | 9-93131 | 4/1997 |
| JP | 10-145788 | 5/1998 |
| JP | 2000-041226 A | 2/2000 |
| JP | 2000-287215 A | 10/2000 |
| JP | 2000-324489 A | 11/2000 |
| WO | WO 00/07366 | 2/2000 |

* cited by examiner

*Primary Examiner*—Tung Vo
(74) *Attorney, Agent, or Firm*—McDermott Will & Emery LLP

(57) ABSTRACT

The multichannel video processing unit of the invention includes: a decoding section for sequentially selecting a bit stream from a plurality of bit streams each including encoded data of an image of one channel, decoding the selected bit stream by one frame each, and outputting decoded data; a vertical filtering section for sequentially selecting a channel from a plurality of channels corresponding to the decoded images, performing vertical processing for the decoded data corresponding to the selected channel, and outputting vertically-processed data; a horizontal filtering section for sequentially selecting a channel according to the position at which the image is to be displayed, performing horizontal processing for the vertically-processed data corresponding to the selected channel, and outputting horizontally-processed data; and an output processing section for generating a video signal for display of images of a plurality of channels by synthesizing the horizontally-processed data and outputting the generated signal.

21 Claims, 18 Drawing Sheets

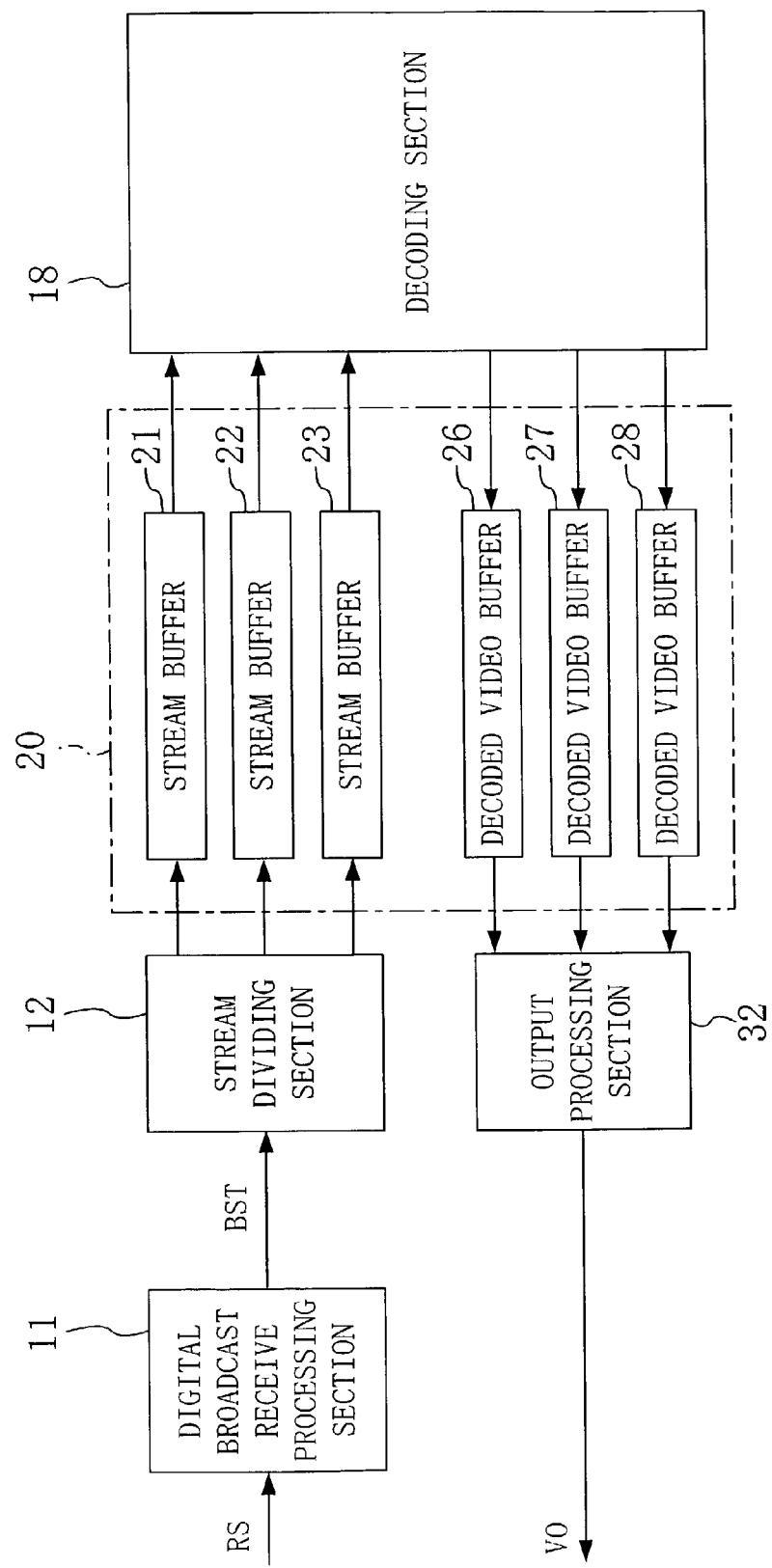

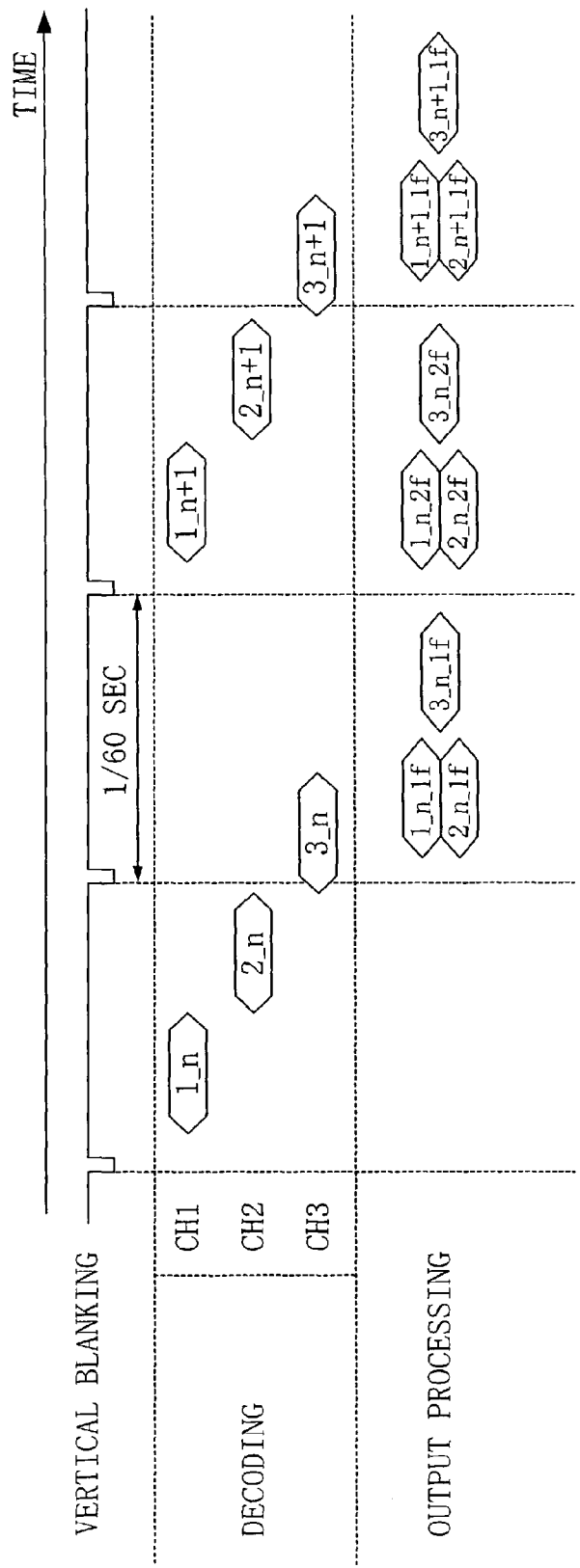

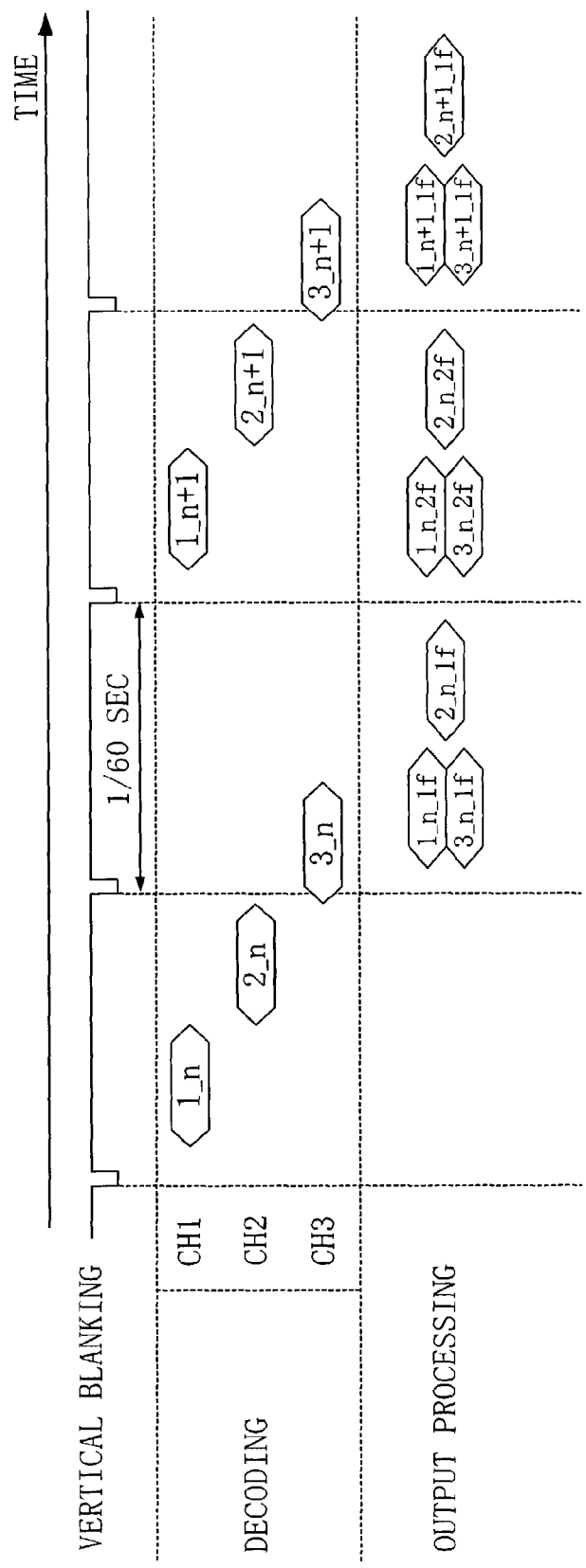

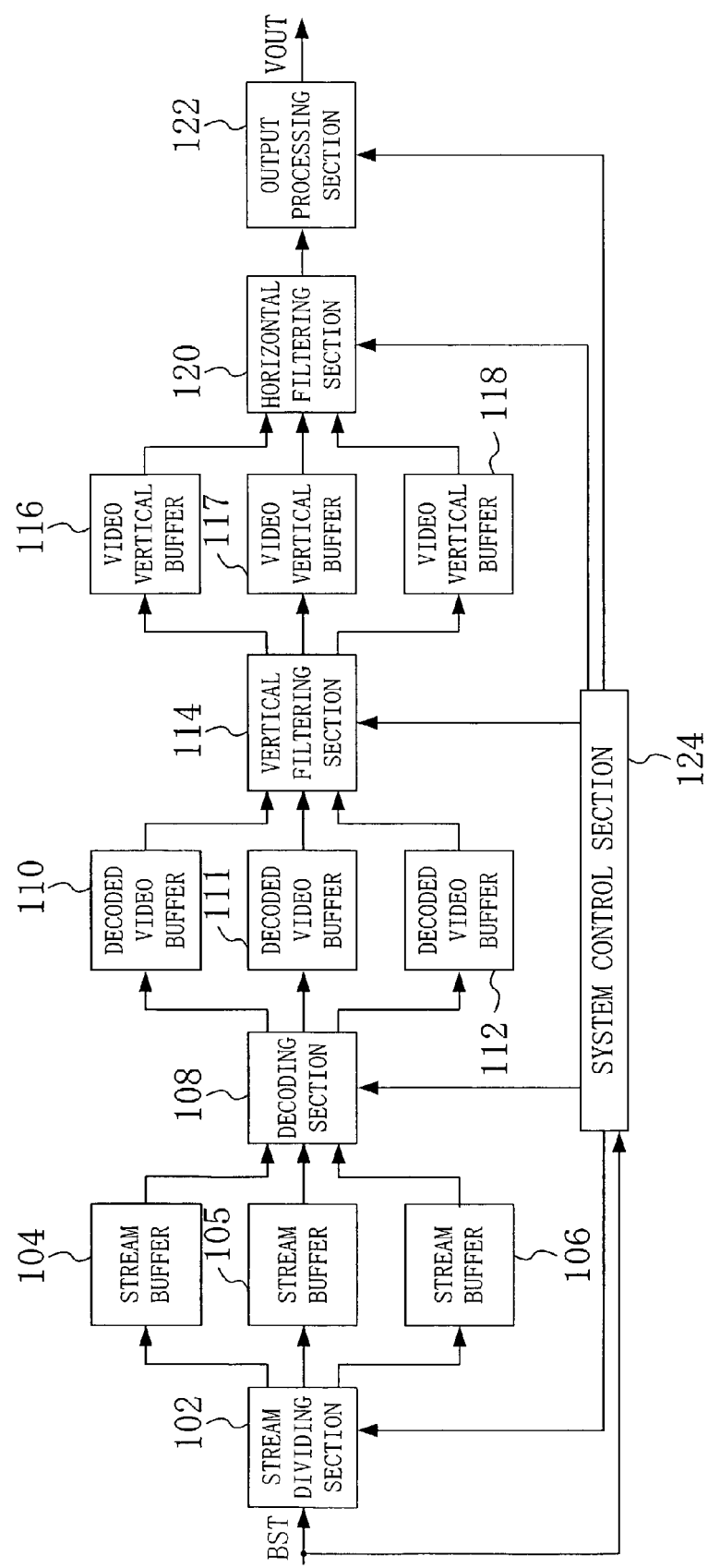

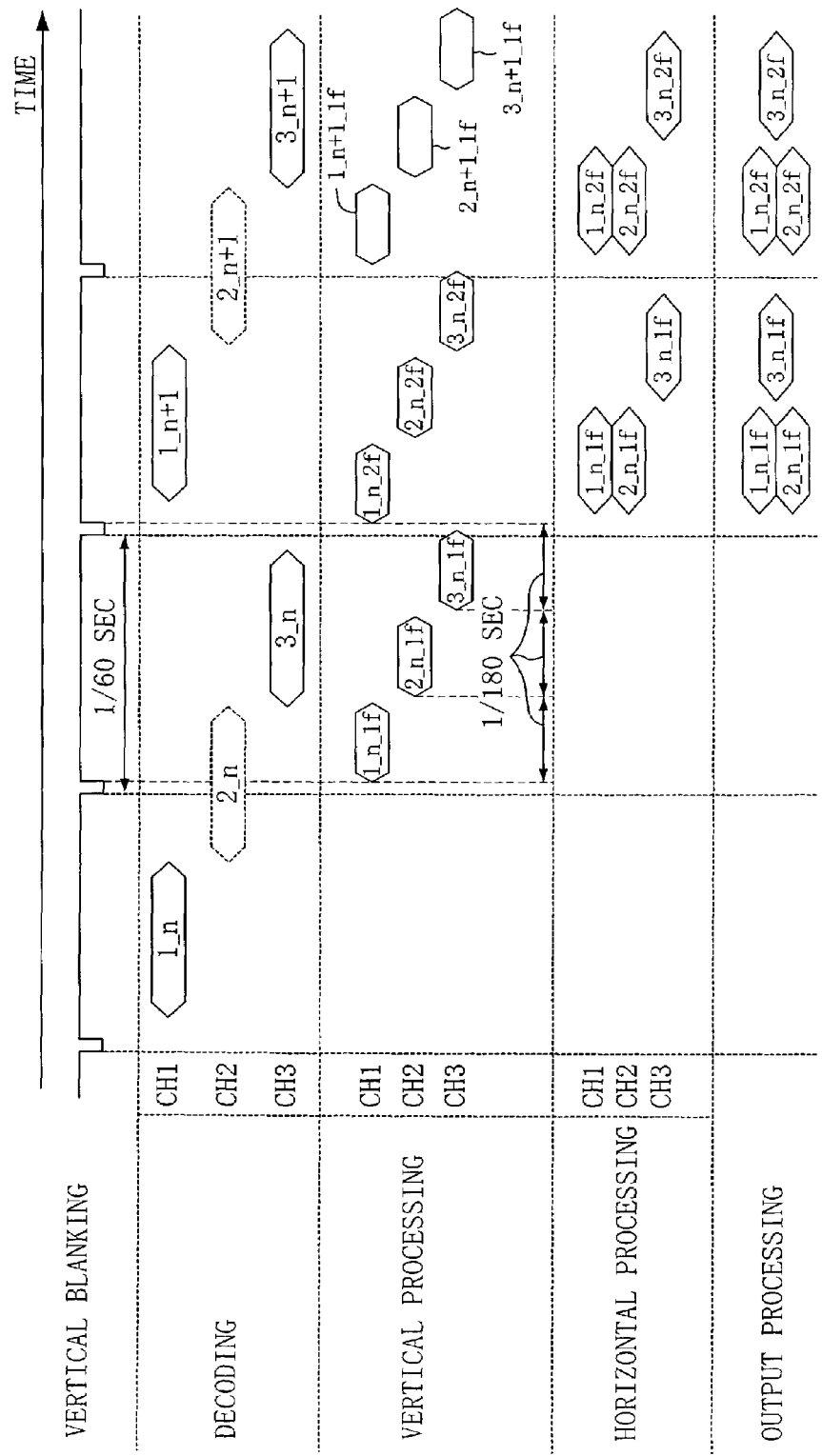

MULTICHANNEL VIDEO PROCESSING UNIT AND METHOD

BACKGROUND OF THE INVENTION

The present invention relates to a video processing technology of decoding a bit stream including encoded data of an image and generating a video signal for displaying the decoded image. In particular, the present invention relates to a multichannel video processing technology dealing with images of a plurality of channels.

In recent years, satellite digital broadcasting and terrestrial digital broadcasting have gained momentum in many countries of the world. In digital broadcasting, data such as images and voice is compressed and encoded in compliance with a scheme such as MPEG (moving picture experts group), and in many cases, images of a plurality of channels are distributed in the multiplexed state.

A digital broadcast receiver, which receives a bit stream including encoded data of images of a plurality of channels in the multiplexed state, basically separates a video stream and an audio stream of one designated channel from the bit stream, decodes the separated streams, and outputs the decoded streams.

In some cases, however, it becomes necessary to decode encoded data of, not only an image of a single channel, but also images of a plurality of channels and display the decoded images simultaneously. For example, Japanese Laid-Open Patent Publication No. 9-93131 discloses an apparatus including a plurality of decoders each adapted to decode a bit stream of one channel.

As described above, conventionally, a plurality of decoders are used for decoding encoded data of images of a plurality of channels. It is therefore difficult to reduce the cost for the decoders.

SUMMARY OF THE INVENTION

An object of the present invention is providing a low-cost multichannel video processing unit and method capable of decoding encoded data of images of a plurality of channels and generating a video signal for displaying the images of the plurality of channels.

Specifically, the present invention is directed to a multichannel video processing unit including: a decoding section for sequentially selecting a bit stream from a plurality of bit streams each including encoded data of an image of one channel, decoding the selected bit stream by one frame each, and outputting resultant decoded data; a vertical filtering section for sequentially selecting a channel from a plurality of channels corresponding to the images decoded by the decoding section, performing vertical processing for the decoded data corresponding to the selected channel, and outputting resultant vertically-processed data; a horizontal filtering section for sequentially selecting a channel from the plurality of channels according to the position at which the image is to be displayed, performing horizontal processing for the vertically-processed data corresponding to the selected channel, and outputting resultant horizontally-processed data; and an output processing section for generating a video signal for display of images of a plurality of channels by synthesizing the horizontally-processed data and outputting the generated video signal.

According to the invention described above, encoded data of images can be decoded by one decoder for a plurality of channels, and after adjustment of the vertical and horizontal sizes and the like for the images of the respective channels, the images of the plurality of channels can be displayed on a display device.

Preferably, the multichannel video processing unit described above further includes a stream dividing section for dividing a bit stream including encoded data of images of a plurality of channels in a time-division multiplexed state into a plurality of bit streams each including encoded data of an image of one channel and outputting the divided bit streams, wherein the decoding section performs the processing for the bit streams divided by the stream dividing section.

According to the invention described above, processing is possible for a bit stream including encoded data of images of a plurality of channels in a time-division multiplexed state.

Preferably, the multichannel video processing unit described above further includes a selector for selecting either one of a bit stream including encoded data of an image of one channel and one of the plurality of bit streams output from the stream dividing section, and outputting the selected one, wherein the decoding section performs the processing for the bit streams selected by the selector.

According to the invention described above, it is possible to display simultaneously an image in a bit stream including encoded data of images of a plurality of channels in a time-division multiplexed state and an image in a bit stream input externally.

In the multichannel video processing unit described above, preferably, the decoding section performs the processing for one frame of the encoded data for the plurality of channels and then for the next frame, the vertical filtering section performs the processing for one field of the decoded data for the plurality of channels and then for the next field, and the horizontal filtering section performs the processing for one line of the vertically-processed data for channels to be displayed on the line and then for the next line.

In the multichannel video processing unit described above, preferably, the vertical filtering section starts the processing for one frame after receiving the next vertical synchronizing signal from the start of the processing for the frame by the decoding section, and the horizontal filtering section and the output processing section start the processing for the frame after the next vertical blanking interval from the start of the processing for the frame by the vertical filtering section.

In the multichannel video processing unit described above, the order of the channels to be processed for a frame by the vertical filtering section is preferably the same as the order in the processing for the same frame by the decoding section.

In the multichannel video processing unit described above, the decoding section preferably starts the processing for the next frame after the vertical filtering section has performed the processing for one slice or more of the second field of the current frame.

In the multichannel video processing unit described above, the vertical filtering section preferably starts the processing for the next channel after a time obtained by dividing the interval of the vertical synchronizing signal by the number of the plurality of channels has passed from the start of the processing for the current channel.

In the multichannel video processing unit described above, the vertical filtering section preferably terminates the processing for a channel when a time obtained by dividing the interval of the vertical synchronizing signal by the number of the plurality of channels has passed from the start of the processing for the channel.

According to the invention described above, even when the vertical processing for one channel fails to be finished within a predetermined time, processing for the other channels will not be affected by this failure.

In the multichannel video processing unit described above, preferably, the output processing section includes output circuits corresponding to respective channels for images to be displayed on a same line, and each of the output circuits stores the horizontally-processed data of the corresponding channel among the channels for images to be displayed on a line to be processed.

According to the invention described above, the output processing section is only required to have output circuits to correspond to the channels for images to be displayed adjacent in the horizontal direction, not to correspond to all the channels multiplexed in the bit stream. This enables downsizing of the hardware.

Preferably, the output processing section synthesizes outputs of those among the output circuits storing data of the channels for the images to be displayed on the line to be processed, and outputs the synthesized data.

In the multichannel video processing unit described above, preferably, when the decoding section halts the processing for some of the channels, the vertical filtering section performs the vertical processing in the same order of the channels as that in which the vertical filtering section has performed the processing for the frame previous to the frame in which the decoding section halts the processing for some of the channels.

According to the invention described above, even when the decoding section halts processing for some channel, processing for the other channels will not be affected by this halt. In addition, the vertical processing is performed for an image of a frozen channel for which the decoding section halts the decoding, and this enables enlargement/reduction of the image.

In the multichannel video processing unit described above, preferably, when the number of channels to be processed is changed, the decoding section performs the decoding for the changed number of channels, the vertical filtering section performs the vertical processing for the changed number of channels after receiving the next vertical synchronizing signal from the start of the decoding for the changed number of channels by the decoding section, and the horizontal filtering section performs the horizontal processing for the changed number of channels after the next vertical blanking interval from the start of the vertical processing for the changed number of channels by the vertical filtering section.

According to the invention described above, it is not necessary to stop the video output during change of the number of channels to be processed.

The multichannel video processing unit described above preferably operates in synchronization with a synchronizing signal prepared for display of images obtained after the change of the number of channels to be processed, from the time at which the next field is started after the start of the vertical processing for the changed number of channels by the vertical filtering section.

According to the invention described above, the vertical synchronizing signal is not disturbed and thus undisturbed images can be output continuously during change of the number of channels to be processed.

In the multichannel video processing unit described above, the output processing section preferably generates a video signal for displaying images of the plurality of channels lined in the horizontal direction.

In the multichannel video processing unit described above, preferably, the output processing section generates a video signal for displaying a plurality of screens, and at least one of the plurality of screens is different in size from the other screens.

Alternatively, the present invention is directed to the multichannel video processing unit for sequentially selecting a bit stream from a plurality of bit streams each including encoded data of an image of one channel, decoding the selected bit stream by one frame each to obtain decoded data for images of a plurality of channels, generating a video signal for displaying images of a plurality of channels based on the resultant decoded data, and outputting the generated video signal.

According to the invention described above, encoded data of images can be decoded by one decoder for a plurality of channels, and the images of the plurality of channels can be displayed on a display device.

According to another aspect, the present invention is directed to a multichannel video processing method including the steps of: decoding a bit stream including sequentially selecting a bit stream from a plurality of bit streams each including encoded data of an image of one channel, and decoding the selected bit stream by one frame each to obtain decoded data; performing vertical filtering including sequentially selecting a channel from a plurality of channels corresponding to the images decoded in the step of decoding, and performing vertical filtering for the decoded data corresponding to the selected channel to obtain vertically-processed data; performing horizontal filtering including sequentially selecting a channel from the plurality of channels according to the position at which the image is to be displayed, and performing horizontal filtering for the vertically-processed data corresponding to the selected channel to obtain horizontally-processed data; and performing output processing including generating a video signal for display of images of a plurality of channels by synthesizing the horizontally-processed data.

According to the invention described above, encoded data of images can be decoded using one decoder for a plurality of channels, and after adjustment of the vertical and horizontal sizes and the like for the images of the respective channels, the images of the plurality of channels can be displayed on a display device.

Preferably, the multichannel video processing method described above further includes the step of dividing a bit stream including encoded data of images of a plurality of channels in a time-division multiplexed state into a plurality of bit streams each including encoded data of an image of one channel, wherein the step of decoding includes performing the processing for the bit streams divided in the step of dividing.

Preferably, the multichannel video processing method described above further includes the step of selecting either one of a bit stream including encoded data of an image of one channel and one of the plurality of bit streams divided in the step of dividing, wherein the step of decoding includes performing the processing for the bit streams selected in the step of selecting.

In the multichannel video processing method described above, preferably, in the step of decoding, the processing is performed for one frame of the encoded data for the plurality of channels and then for the next frame, in the step of performing vertical filtering, the processing is performed for one field of the decoded data for the plurality of channels and then for the next field, and in the step of performing horizontal filtering, the processing is performed for one line of the vertically-processed data for the channels to be displayed on the line and then for the next line.

In the multichannel video processing method described above, preferably, in the step of performing vertical filtering, the processing for one frame is started after receiving the next vertical synchronizing signal from the start of the processing for the frame by the decoding section, and in the step of performing horizontal filtering and the step of performing output processing, the processing for the frame is started after the next vertical blanking interval from the start of the processing for the frame in the step of performing vertical filtering.

In the multichannel video processing method described above, the order of the channels to be processed in the step of performing vertical filtering is preferably the same as the order in the processing for the same frame in the step of decoding.

In the multichannel video processing method described above, in the step of decoding, the processing for the next frame is preferably started after the processing for one slice or more of the second field of the current frame in the step of vertical filtering.

In the multichannel video processing method described above, in the step of vertical filtering, the processing for the next channel is preferably started after a time obtained by dividing the interval of the vertical synchronizing signal by the number of the plurality of channels has passed from the start of the processing for the current channel.

In the multichannel video processing method described above, in the step of vertical filtering, the processing for a channel is preferably terminated when a time obtained by dividing the interval of the vertical synchronizing signal by the number of the plurality of channels has passed from the start of the processing for the channel.

In the multichannel video processing method described above, preferably, in the step of performing output processing, the horizontally-processed data corresponding to channels for images to be displayed on a line to be processed is synthesized.

In the multichannel video processing method described above, preferably, when the processing for some of the channels is halted in the step of decoding, the vertical processing in the step of performing vertical filtering is performed in the same order of the channels as that in which the processing for the frame previous to the frame in which the decoding section halts the processing for some of the channels in the step of decoding has been performed in the step of performing vertical filtering.

In the multichannel video processing method described above, preferably, when the number of channels to be processed is changed, in the step of decoding, the decoding for the changed number of channels is performed, in the step of performing vertical filtering, the vertical processing for the changed number of channels is performed after receiving the next vertical synchronizing signal from the start of the decoding for the changed number of channels in the step of decoding, and in the step of horizontal filtering, the horizontal processing for the changed number of channels is performed after the next vertical blanking interval from the start of the vertical processing for the changed number of channels in the step of performing vertical filtering.

In the multichannel video processing method described above, preferably, operation is performed in synchronization with a synchronizing signal prepared for display of images obtained after the change of the number of channels to be processed from the time at which the next field is started after the start of the vertical processing for the changed number of channels in the step of performing vertical filtering.

In the multichannel video processing method described above, the step of performing output processing preferably includes generating a video signal for displaying images of the plurality of channels lined in the horizontal direction.

In the multichannel video processing method described above, preferably, the step of performing output processing includes generating a video signal for displaying a plurality of screens, and at least one of the plurality of screens is different in size from the other screens.

Alternatively, the present invention is directed to a multichannel video processing method including the steps of: sequentially selecting a bit stream from a plurality of bit streams each including encoded data of an image of one channel; decoding the selected bit stream by one frame each to obtain decoded data for images of a plurality of channels; and generating a video signal for displaying images of a plurality of channels based on the resultant decoded data.

According to the invention described above, encoded data of images can be decoded using one decoder for a plurality of channels, and the images of the plurality of channels can be displayed on a display device.

BRIEF DESCRIPTION OF THE DRAWINGS

FIG. 1 is a block diagram of a multichannel video processing unit of Embodiment 1 of the present invention.

FIG. 3 is a timing chart of an example of operation of a decoding section and an output processing section of the multichannel video processing unit of FIG. 1.

FIG. 4 is a timing chart of another example of operation of the decoding section and the output processing section of the multichannel video processing unit of FIG. 1.

FIG. 5 is a block diagram of a multichannel video processing unit of Embodiment 2 of the present invention.

FIG. 14 is a timing chart demonstrating an example of operation of the multichannel video processing unit of FIG. 5 performed when channel 2 is frozen.

DESCRIPTION OF THE PREFERRED EMBODIMENTS

Figure 2A:
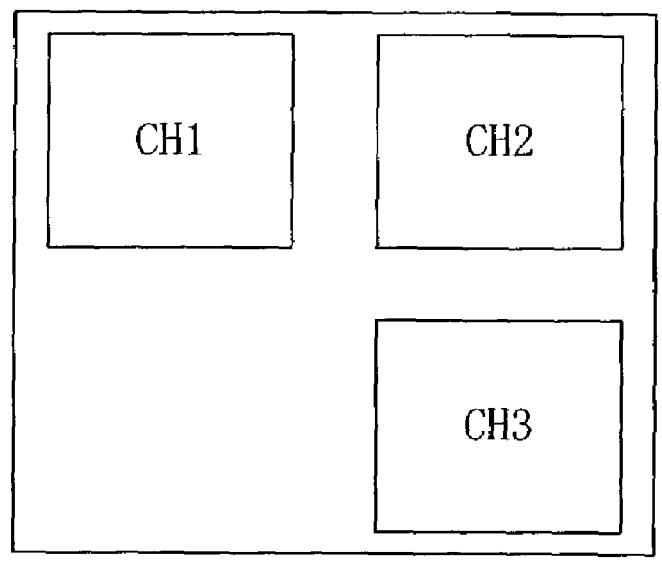
FIG. 2A is an illustration of an example of display in which images of channel 1 (CH1) and channel 2 (CH2) are displayed on the upper part of a screen of a display device and an image of channel 3 (CH3) is displayed on the lower part thereof.

Hereinafter, preferred embodiments of the present invention will be described with reference to the accompanying drawings.

Embodiment 1

FIG. 1 is a block diagram of a multichannel video processing unit of Embodiment 1 of the present invention. The multichannel video processing unit of FIG. 1 includes a digital broadcast receive processing section 11, a stream dividing section 12, a frame memory 20, a decoding section 18 and an output processing section 32. The frame memory 20 includes stream buffers 21, 22 and 23 and decoded video buffers 26, 27 and 28.

A receive signal RS including information of a multiplexed bit stream is input into the digital broadcast receive processing section 11. The digital broadcast receive processing section 11 performs tuning and demodulation for the receive signal RS and outputs the results as a bit stream BST to the stream dividing section 12. The bit stream BST includes encoded data of images of a plurality of channels in the time-division multiplexed state. In the following description, it is assumed, as an example, that encoded data of images of three channels is multiplexed in the bit stream BST. It is also assumed that the data of images of the channels is for interlacing and that the field period is about 1/60 second.

The stream buffers 21, 22 and 23 correspond to channels 1, 2 and 3, respectively. The stream dividing section 12 divides the multiplexed bit stream BST into bit streams for the respective channels, that is, bit streams each including encoded data of the image of one channel, and outputs the divided bit streams to the corresponding stream buffers 21 to 23. The stream buffers 21 to 23 store the encoded data included in the bit streams of the corresponding channels.

The decoding section 18, which includes a single decoder, sequentially selects one of the three channels and reads the encoded data of the selected channel by one frame each as a bit stream from one of the stream buffers 21 to 23 corresponding to the selected channel. The decoded video buffers 26, 27 and 28, which are frame buffers, correspond to the channels 1, 2 and 3, respectively. The decoding section 18 decodes the read encoded data by one frame each, and outputs the decoded data to one of the decoding video buffers 26 to 28 corresponding to the selected channel. The decoded video buffers 26 to 28 store the decoded data of the corresponding channels.

The output processing section 32 reads the decoded data of the plurality of channels from the decoded video buffers 26 to 28, synthesizes the data as required, generates a video signal VO for display of the images of the plurality of channels lined in the horizontal direction. The video signal VO output from the output processing section 32 is supplied to a display device such as a cathode ray tube (CRT) for display.

Figure 2B:
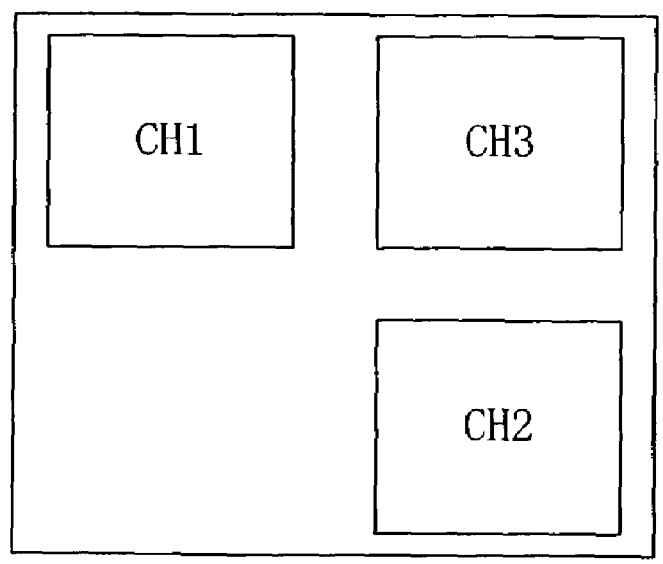
FIG. 2B is an illustration of another example of display in which images of channel 1 and channel 3 are displayed on the upper part of a screen of a display device and an image of channel 2 is displayed on the lower part thereof.

FIG. 2A illustrates an example of display in which the images of the channel 1 (CH1) and the channel 2 (CH2) are displayed on the upper half of a display device, while the image of the channel 3 (CH3) is displayed on the lower half thereof. FIG. 2B illustrates another example of display in which the images of the channel 1 and the channel 3 are displayed on the upper half of the display device, while the image of the channel 2 is displayed on the lower half thereof.

FIG. 3 is a timing chart showing an example of operation of the decoding section 18 and the output processing section 32 of the multichannel image processing unit of FIG. 1. FIG. 3 shows a case of display as shown in FIG. 2A, that is, displaying the images of the channels 1 and 2 on the upper half of the screen while displaying the image of the channel 3 on the lower half thereof.

In FIG. 3, each object to be processed is represented by a code like "1_n_1f", for example, in which the first part "1", "2" or "3" indicates the channel to be processed, the second part "n", "n+1" or the like indicates the frame number to be processed (n is an integer), and the end part "1f" or "2f", if any, indicates that the first or second field is under processing. For example, "1_n+1" means "1_(n+1)".

Referring to FIG. 3, the decoding section 18 sequentially reads the bit streams of the respective channels from the stream buffers 21 to 23, decodes the bit streams, and outputs the decoded data to the decoded video buffers 26 to 28 to be stored therein. The output processing section 32 reads the decoded data from the decoded video buffers 26 to 28 and outputs the video signal VO generated so that the images of the respective channels are displayed at desired positions on the display screen.

For example, assume that the decoding section 18 performs the processing for the n-th frame in the order of the channels 1, 2 and 3. The decoding section 18 decodes the bit stream of the channel 1 by one frame (decoding "1_n"), then upon completion of this processing, decodes the bit stream of the channel 2 by one frame (decoding "2_n"), and upon completion of this processing, decodes the bit stream of the channel 3 by one frame (decoding "3_n"). After the next vertical blanking interval from the start of the decoding for the channel 1, the output processing section 32 performs output processing for the respective channels so that the channels are displayed as shown in FIG. 2A (output processing "1_n_1f", "2_n_1f" and "3_n_1f") to thereby generate and output the video signal VO.

As described above, in the multichannel video processing unit of FIG. 1, encoded data of images of a plurality of channels can be sequentially decoded by a single decoder, and also the images of the plurality of channels can be displayed simultaneously on one display device.

FIG. 4 is a timing chart showing another example of operation of the decoding section 18 and the output processing section 32 of the multichannel image processing unit of FIG. 1. FIG. 4 shows a case of display as shown in FIG. 2B, that is, displaying the images of the channels 1 and 3 on the upper half of the screen while displaying the image of the channel 2 on the lower half thereof.

In the case of FIG. 4, the decoding section 18 has just started the decoding "3_n" for the channel 3 and thus not yet finished the processing of one field when the output processing section 32 starts the output processing for the image of the channel 3. For this reason, at this time, a synthesis of the current frame for a decoded portion and the previous frame for the remaining portion is displayed as the image of the channel 3. Thus, proper display is not available for the image of the channel 3.

To ensure proper display of all the images of the channels 1 to 3 at arbitrary positions in the multichannel video processing unit of FIG. 1, it is necessary to complete the decoding for the three channels by one frame before the start of the output processing, that is, within one field period. In other words, the decoding section 18 is required to have performance twice as high as that required for decoding the same number of channels by one frame within one frame period. High decoding performance is therefore required for the decoding section. In consideration of this, proposed in Embodiment 2 to follow is a multichannel image processing unit capable of displaying the images of the channels 1 to 3 properly at arbitrary positions without the necessity of having so high decoding performance.

Embodiment 2

FIG. 5 is a block diagram of a multichannel video processing unit of Embodiment 2 of the present invention. The multichannel video processing unit of FIG. 5 includes a stream dividing section 102, stream buffers 104, 105 and 106, a decoding section 108, decoded video buffers 110, 111 and 112, a vertical filtering section 114, video vertical buffers 116, 117 and 118, a horizontal filtering section 120, an output processing section 122 and a system control section 124.

A bit stream BST, including encoded data of images of a plurality of channels in the time-division multiplexed state, is input into the stream dividing section 102 and the system control section 124. Assume that the bit stream BST is the same as that described in Embodiment 1.

The system control section 124 determines the number of channels multiplexed in the input bit stream BST, and also controls the enlargement/reduction ratio of the images of the channels and the display positions of the images on the screen. The system control section 124 controls the stream dividing section 102, the decoding section 108, the vertical filtering section 114, the horizontal filtering section 120 and the output processing section 122 in various aspects.

The stream dividing section 102 divides the input bit stream BST into bit streams of the respective channels, and outputs each of the divided bit streams to one of the stream buffers 104, 105 and 106. The stream buffers 104, 105 and 106, corresponding to the channels 1, 2 and 3, respectively, store encoded data included in the bit streams of the corresponding channels.

The decoding section 108, which includes a single decoder, sequentially selects one of the three channels according to an instruction from the system control section 124, reads the encoded data of the image of the selected channel by one frame each from one of the stream buffers 104, 105 and 106 corresponding to the selected channel, decodes the read data, and outputs the decoded data to one of the decoded video buffers 110, 111 and 112. The decoded video buffers 110, 111 and 112, which are frame buffers corresponding to the channels 1, 2 and 3, respectively, store the decoded data for the corresponding channels.

The vertical filtering section 114 sequentially selects one of the three channels according to an instruction from the system control section 124, and reads the decoded data by one field each from one of the decoded video buffers 110, 111 and 112 corresponding to the selected channel. The vertical filtering section 114 performs vertical processing for the read decoded data, including enlargement/reduction of the screen of the image in the vertical direction and vertical filtering, according to instructions from the system control section 124 and the decoding section 108, and outputs the resultant vertically-processed data to one of the video vertical buffers 116, 117 and 118. The video vertical buffers 116, 117 and 118, which are frame buffers corresponding to the channels 1, 2 and 3, respectively, stores the vertically-processed data of the corresponding channels.

The horizontal filtering section 120 sequentially selects one of the three channels, as required, based on the display positions of the images of the channels on the screen according to an instruction from the system control section 124. The horizontal filtering section 120 reads the vertically-processed data by one line each from one of the video vertical buffers 116, 117 and 118 corresponding the selected channel. The horizontal filtering section 120 then performs horizontal processing for the read data, including enlargement/reduction of the screen of the image in the horizontal direction and horizontal filtering, and outputs the resultant horizontally-processed data to the output processing section 122. The output processing section 122 synthesizes the horizontally-processed data and outputs the results as an output video signal VOUT, which is supplied to a display device such as a CRT for display.

Figure 6:
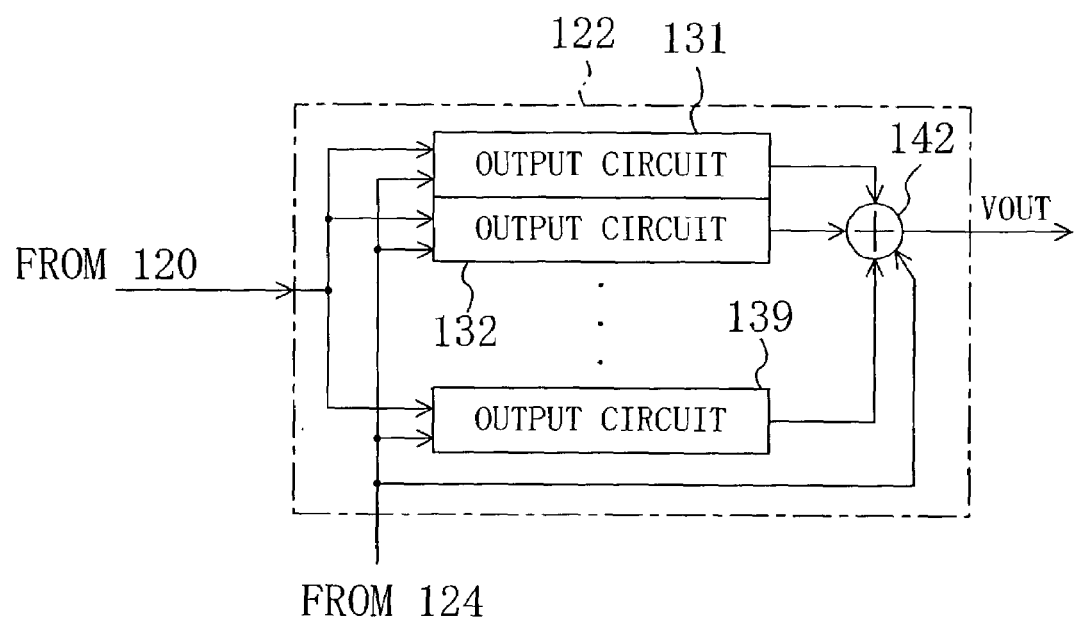
FIG. 6 is a block diagram of an output processing section in FIG. 5.

FIG. 6 is a block diagram of the output processing section 122 in FIG. 5. Referring to FIG. 6, the output processing section 122 includes output circuits 131, 132, 139 and an image synthesis section 142. The output circuits 131, 132, 139, which correspond to channels for images to be displayed on a same line on the screen, store data for the line currently displayed and data for the line to be displayed next for the corresponding channels. The image synthesis section 142 sequentially reads the data from the output circuits 131, 132, 139 based on the display positions of the images of the respective channels on the screen according to an instruction from the system control section 124, adds the read data together, and outputs the results as the output video signal VOUT.

The output processing section 122 of FIG. 6, having three output circuits 131, 132 and 139, can display images of three channels on a same line, that is, can display images of three channels at positions lined in the horizontal direction on the screen. If display of images of two channels on a same line is sufficient, only two output circuits may be provided. In other words, it is not necessary to provide one output circuit for each of all the channels multiplexed in the input bit stream BST.

Figure 7:
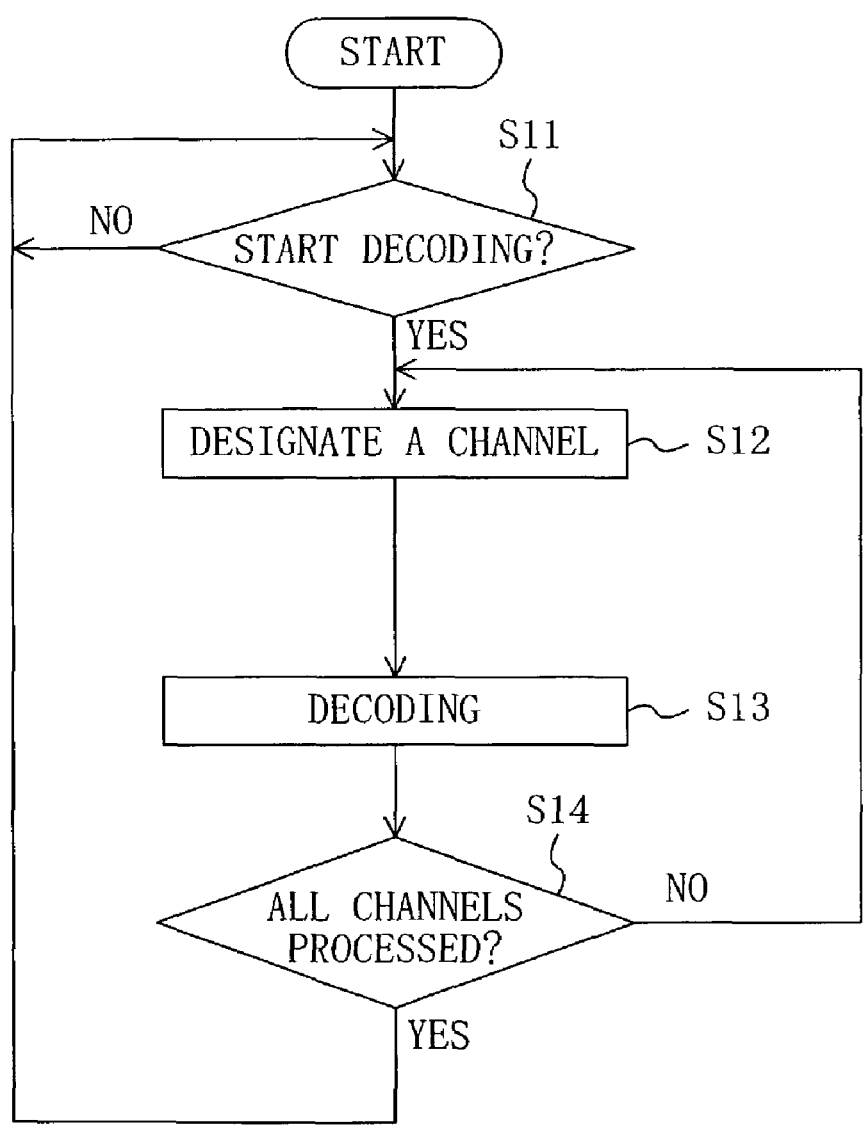
FIG. 7 is a flowchart of decoding performed by a decoding section in FIG. 5.

FIG. 7 is a flowchart showing the decoding performed by the decoding section 108. In step S11, the decoding section 108 determines whether or not decoding of the first channel among the three channels multiplexed in the bit stream BST should be started, based on the timing of a vertical synchronizing signal. If the vertical synchronizing signal is detected, the process proceeds to step S12, to start the decoding of the first channel. If no vertical synchronizing signal is detected, the operation in step S11 is executed again. In step S12, the decoding section 108 receives designation of the channel to be processed from the system control section 124.

In step S13, the decoding section 108 selects one of the stream buffers 104, 105 and 106 corresponding to the designated channel and reads the encoded data stored in the selected stream buffer. The decoding section 108 decodes the read encoded data by one frame and sends the decoded data to one of the decoded video buffers 110, 111 and 112 corresponding to the designated channel for storage. The decoding section 108 decodes the first field of one frame and then proceeds to decoding of the second field of the same frame.

In step S14, the decoding section 108 determines whether or not the decoding of all the channels multiplexed in the bit stream BST has been completed. If completed, the process proceeds to step S11 for processing of the next frame. If not completed, the process returns to step S12 for decoding of the non-processed channel.

Figure 8:
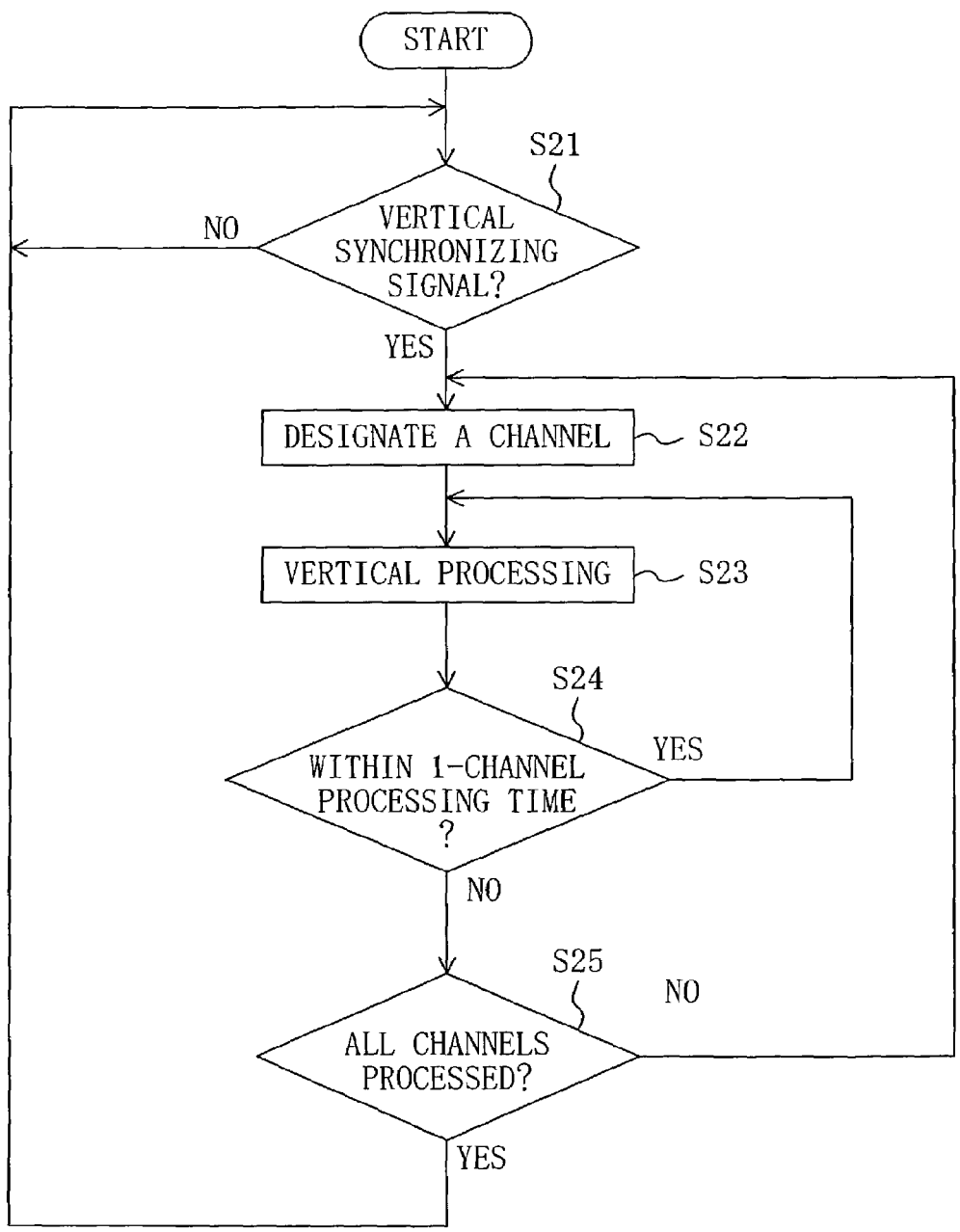
FIG. 8 is a flowchart of vertical processing performed by a vertical filtering section in FIG. 5.

FIG. 8 is a flowchart of the vertical processing performed by the vertical filtering section 114. In step S21, the vertical filtering section 114 determines whether or not a vertical synchronizing signal is detected. If the vertical synchronizing signal is detected, the process proceeds to step S22 to start the processing of the first channel. If no vertical synchronizing signal is detected, the operation of step S21 is executed again.

In step S22, the vertical filtering section 114 receives designation of the channel to be processed from the system control section 124. The order in which the channels are designated is basically the same as that of the decoding for the same frame by the decoding section 108.

In step S23, the vertical filtering section 114 reads the decoded data from one of the decoded video buffers 110, 111 and 112 corresponding to the designated channel. The vertical filtering section 114 performs the vertical processing for the read decoded data and sends the resultant vertically-processed data to one of the video vertical buffers 116, 117 and 118 corresponding to the designated channel for storage. The processing in step S23 is performed for each slice. Once the processing of one slice is finished, the process proceeds to step S24. The slice refers to a strip region constituting part of a one-field screen.

In step S24, the vertical filtering section 114 determines whether or not it is within the time available for the processing of one field of one channel. The time available for the processing of one field of one channel is the time obtained by dividing the time per field by the number of channels of images multiplexed in the bit stream BST. For example, when the field period is about $\frac{1}{60}$ second and images of three channels are multiplexed in the bit stream BST, the processing time available for one channel is about $\frac{1}{180}$ second. If the time that has passed from the start of the processing for the current field is within the processing time available for one channel and the processing for this field has not yet been finished, the process returns to step S23 to enable the vertical filtering section 114 to perform the processing for the next slice. Otherwise, the vertical filtering for this channel is terminated, and the process proceeds to step S25.

In step S25, the vertical filtering section 114 determines whether or not the processing for all the channels has been completed. If completed, the process proceeds to step S21 for processing of the next field. If not completed, the process returns to step S22 for processing of a non-processed channel.

Figure 9:
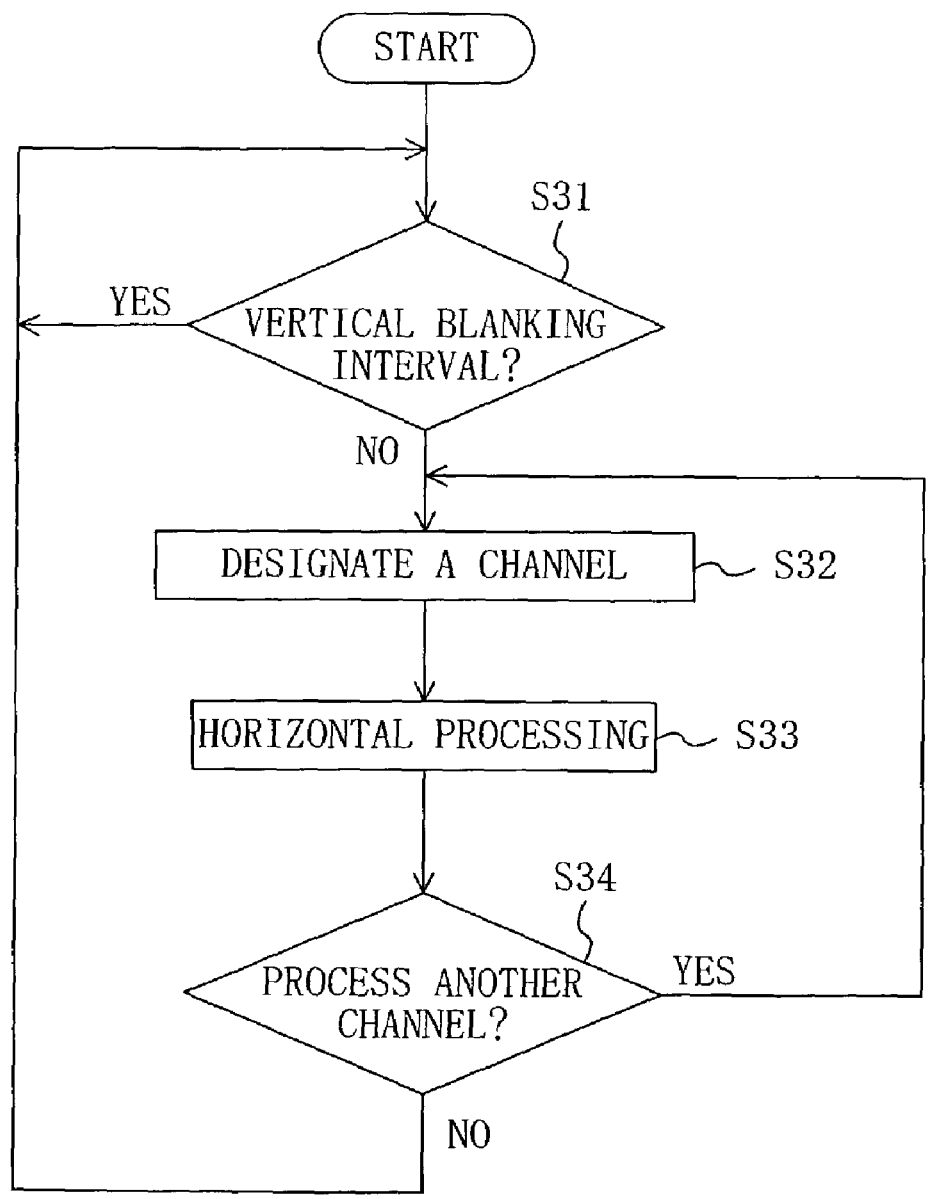
FIG. 9 is a flowchart of horizontal processing performed by a horizontal filtering section in FIG. 5.

FIG. 9 is a flowchart of the horizontal processing performed by the horizontal filtering section 120 in FIG. 5. In step S31, the horizontal filtering section 120 determines whether or not it is in the vertical blanking interval. If it is in the vertical blanking interval, the operation in step S31 is executed again. If it is not in the vertical blanking interval, the process proceeds to step S32 for start of the processing of the first channel.

In step S32, the horizontal filtering section 120 receives designation of the channel to be processed from the system control section 124. Specifically, one of the channels displayed in a same line is designated. In step S33, the horizontal filtering section 120 reads the vertically-processed data from one of the video vertical buffers 116, 117 and 118 corresponding to the designated channel. The horizontal filtering section 120 performs the horizontal processing for the read data, and outputs the resultant horizontally-processed data to the output processing section 122.

In step S34, the horizontal filtering section 120 determines whether or not processing for another channel should be performed. When images of two or more channels are to be displayed in a same line, images of all the channels to be displayed in the line must be processed. If there is another channel to be processed, the process returns to step S32 to perform the processing for a non-processed channel. Otherwise, the process proceeds to step S31 for processing of the next line.

Figure 10:
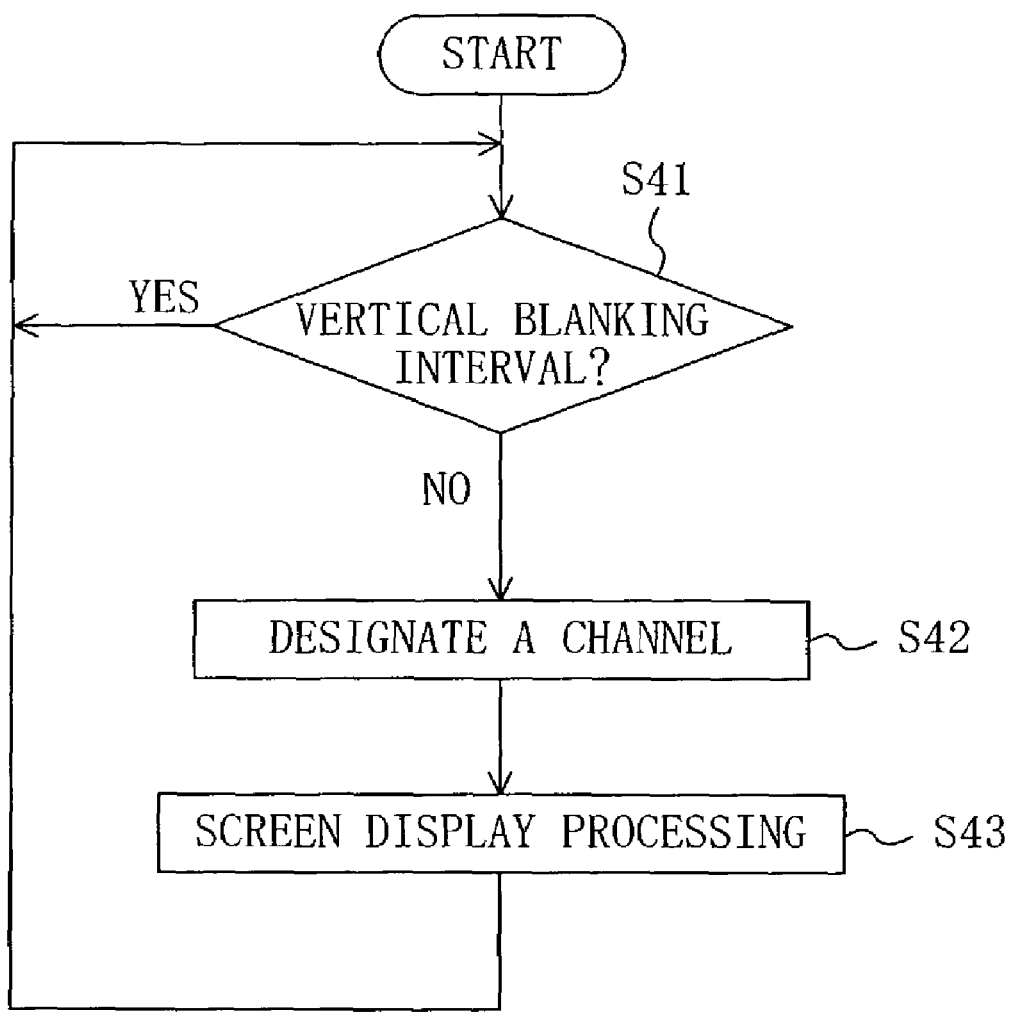
FIG. 10 is a flowchart of output processing performed by the output processing section in FIG. 5.

FIG. 10 is a flowchart of the output processing performed by the output processing section 122. In step S41, the output processing section 122 determines whether or not it is in the vertical blanking interval. If it is in the vertical blanking interval, the operation in step S41 is executed again. If it is not in the vertical blanking interval, the process proceeds to step S42.

In step S42, the output processing section 122 receives designation of the channel to be displayed from the system control section 124. In step S43, the output processing section 122 synthesizes the data of the channels based on the positions at which the images should be displayed, and outputs the data for display of one line. The process then proceeds to step S41 for processing of the next line.

Figure 11:
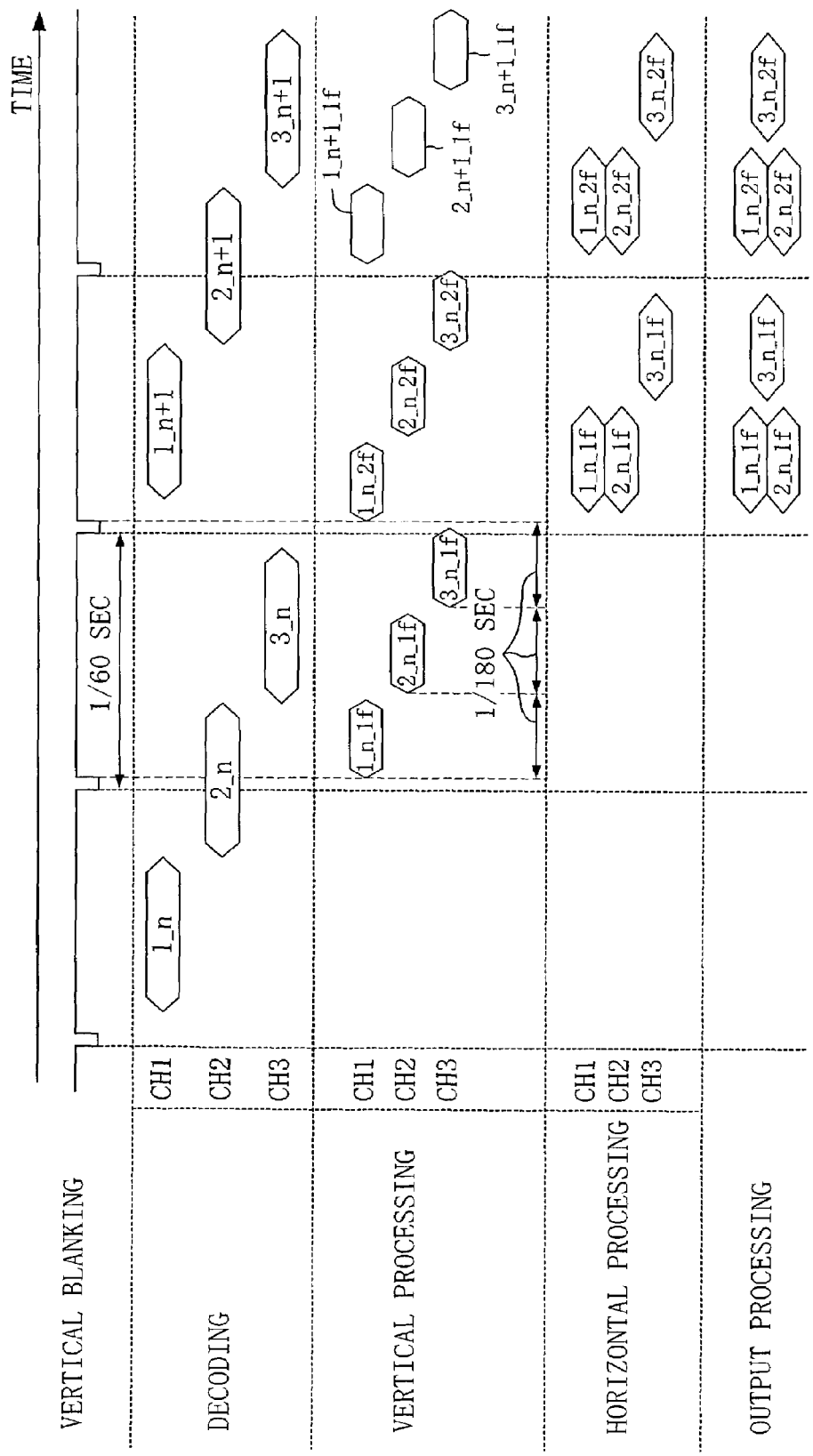
FIG. 11 is a timing chart of an example of operation of the multichannel video processing unit of FIG. 5.

FIG. 11 is a timing chart of an example of operation of the multichannel video processing unit of FIG. 5. FIG. 11 shows a case of display as shown in FIG. 2A, that is, displaying the images of the channels 1 and 2 on the upper half of the screen while displaying the image of the channel 3 on the lower half thereof. In FIG. 11, the vertical blanking interval is shown as the period of the low-potential level in the waveform of the signal representing the vertical blanking interval.

In FIG. 11, the decoding "1_n" refers to the processing that the decoding section 108 reads the encoded data of the n-th frame of the channel 1 from the stream buffer 104, decodes the read data, and outputs the decoded data to the decoded video buffer 110. The decoding section 108 starts this processing after receiving the vertical synchronizing signal.

The decoding "2_n" refers to the processing that the decoding section 108 reads the encoded data of the n-th frame of the channel 2 from the stream buffer 105, decodes the read data, and outputs the decoded data to the decoded video buffer 111. The decoding section 108 starts the decoding "2_n" after the decoding "1_n" is finished.

The decoding "3_n" refers to the processing that the decoding section 108 reads the encoded data of the n-th frame of the channel 3 from the stream buffer 106, decodes the read data, and outputs the decoded data to the decoded video buffer 112. The decoding section 108 starts the decoding "3_n" after the decoding "2_n" is finished.

In each of the decoding "1_n", "2_n" and "3_n", the decoding section 108 performs the processing for the first field in the first half of the decoding and the processing for the second field in the latter half The vertical processing "1_n_1f" refers to the vertical processing for the first field of the n-th frame of the channel 1, in which the vertical filtering section 114 reads the decoded data of the channel 1 from the decoded video buffer 110, performs the vertical processing, and outputs the resultant vertically-processed data to the video vertical buffer 116. The vertical filtering section 114 starts this processing after a lapse of the time equivalent of one field from the start of the decoding "1_n", or after receiving the first vertical synchronizing signal from the start of the decoding "1_n", for example.

The vertical processing "2_n_1f" refers to the vertical processing for the first field of the n-th frame of the channel 2, in which the vertical filtering section 114 reads the decoded data of the channel 2 from the decoded video buffer 111, performs the vertical processing, and outputs the resultant vertically-processed data to the video vertical buffer 117. As described above with reference to FIG. 8, the processing time available for one channel is about 1/180 second. Therefore, the vertical filtering section 114 starts this processing about 1/180 second after the start of the vertical processing "1_n_1f".

The vertical processing "3_n_1f" refers to the vertical processing for the first field of the n-th frame of the channel 3, in which the vertical filtering section 114 reads the decoded data of the channel 3 from the decoded video buffer 112, performs the vertical processing, and outputs the resultant vertically-processed data to the video vertical buffer 118. The vertical filtering section 114 starts this processing about 1/180 second after the start of the vertical processing "2_n_1f".

Thereafter, the horizontal processing "1_n_1f" by one line each and the horizontal processing "2_n_1f" by one line each are performed alternately, to complete the processing for one field of the channels 1 and 2. Subsequently, the horizontal processing "3_n_1f" is performed. The processing in this order is performed to display the images of the channels 1 and 2 on the upper half of the screen and the image of the channel 3 on the lower half thereof as shown in FIG. 2A.

The horizontal processing "1_n_1f" refers to the horizontal processing for the first field of the n-th frame of the channel 1, in which the horizontal filtering section 120 reads the vertically-processed data of the channel 1 from the video vertical buffer 116, performs the horizontal processing, and outputs the resultant horizontally-processed data to the output processing section 122. The horizontal filtering section 120 starts this processing after a lapse of the time equivalent of one field from the start of the vertical processing "1_n_1f", or after the first vertical blanking interval from the start of the vertical processing "1_n_1f", for example. The horizontal filtering section 120 performs the horizontal processing by one line each according to an instruction from the system control section 124.

Likewise, the horizontal processing "2_n_1f" and "3_n_1f" refer to the horizontal processing for the first field of the n-th frame of the channels 2 and 3, respectively, in which the horizontal filtering section 120 reads the vertically-processed data of the channels 2 and 3 from the video vertical buffers 117 and 118, performs the horizontal processing, and outputs the resultant horizontally-processed data to the output processing section 122.

The output processing "1_n_1f" refers to the output processing for the first field of the n-th frame of the channel 1, in which the output processing section 122 outputs the horizontally-processed data of the channel 1 to the screen at an appropriate timing according to an instruction from the system control section 124.

The output processing section 122 starts the processing for a certain line after a lapse of the time equivalent of one line from the start of the horizontal processing for the line by the horizontal filtering section 120.

Likewise, the output processing "2_n_1f" and "3_n_1f" refer to the output processing for the first field of the n-th frame of the channels 2 and 3, respectively, in which the output processing section 122 outputs the horizontally-processed data of the channels 2 and 3 to the screen at an appropriate timing according to an instruction from the system control section 124.

Once finishing the processing for the first field, the vertical filtering section 114, the horizontal filtering section 120 and the output processing section 122 start their processing for the second field. The vertical filtering section 114 starts the vertical processing "1_n_2f" for the second field after a lapse of the time equivalent of one field from the start of the vertical processing "1_n_1f", or after receiving the first vertical synchronizing signal from the start of the vertical processing "1_n_1f", for example.

The same processing is performed for the (n+1)th and subsequent frames. The decoding section 108 starts the decoding "1_n+1" for the encoded data of the (n+1)th frame of the channel 1 after a lapse of the time equivalent of one frame from the start of the decoding "1_n", or after receiving the second vertical synchronizing signal from the start of the decoding "1_n", for example.

The decoding section 108 preferably starts the decoding "1_n+1" for the next (n+1)th frame immediately after the vertical filtering section 114 finishes the processing for one slice in the vertical processing "1_n_2f". By this arrangement, the decoding section 108 is prevented from overwriting the decoded data of the second field of the n-th frame of the channel 1 with the next decoded data of the second field of the (n+1)th frame of the channel 1 before the vertical filtering section 114 finishes the vertical processing "1_n_2f" for the former decoded data. In addition, the maximum time can be secured for the decoding.

The first half of the decoding "1_n" for the channel 1 to be first processed among the three channels should only have been finished before the start of the vertical processing "1_n_1f" for the channel 1. Likewise, the first half of the decoding "2_n" and the first half of the decoding "3_n" should only have been finished before the start of the vertical processing "2_n_1f" and "3_n_1f", respectively.

The decoding section 108 does not have to complete the decoding of the n-th frame for all the channels before the start of the vertical processing "1_n_1f" for the channel 1, that is, within the interval V of the vertical synchronizing signal. Therefore, the performance of the decoding section 108 is not necessarily so high. For example, as shown in FIG. 11, the time period allowed for the decoding of the (n+1)th frame for all the channels is from the finish of the processing of one slice in the vertical processing "1_n_2f" until immediately before the finish of the vertical processing "3_n+1_1f", which is as long as about 1.9 V.

If the vertical processing of one field of one channel fails to be finished within the time V/c (c is the number of channels) from the start of the processing, the vertical filtering section 114 terminates the processing after a lapse of the time V/c. This prevents the vertical processing for the other channels from being affected by this failure. For the portion of the field of which processing has failed, the horizontal filtering section 120 reads, instead, vertically-processed data of the previous frame from the corresponding one of the video vertical buffers 116 to 118.

Figure 12:
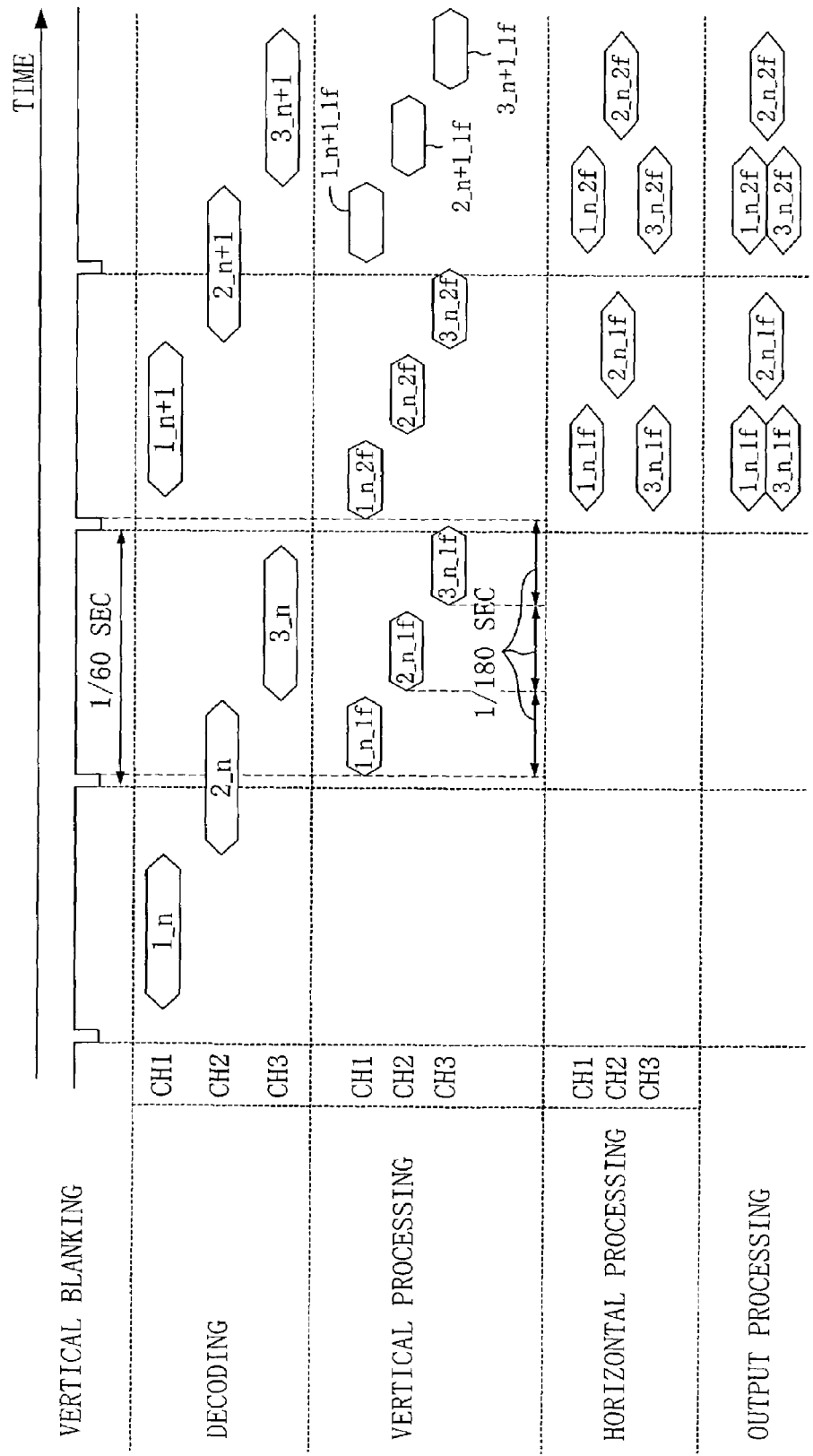
FIG. 12 is a timing chart of another example of operation of the multichannel video processing unit of FIG. 5.

FIG. 12 is a timing chart of another example of operation of the multichannel video processing unit of FIG. 5. FIG. 12 shows a case of display as shown in FIG. 2B, that is, displaying the images of the channels 1 and 3 on the upper half of the screen while displaying the image of the channel 2 on the lower half thereof. The displays in FIGS. 2A and 2B are different from each other in that the positions at which the image of the channel 2 and the image of the channel 3 are displayed are the opposite of each other. Therefore, in FIG. 12, the processing for the channel 2 and the processing for the channel 3 in FIG. 11 are interchanged with each other in the horizontal processing and the output processing. The other processing in FIG. 12 is the same as that in FIG. 11, and therefore the description is omitted here.

As described above, in the multichannel video processing unit of FIG. 5, the decoding has been completed for all the three channels before the start of the output processing in both cases shown in FIGS. 11 and 12. This prevents an occurrence of the problem that the decoding is not in time for some channel and thus the image of the previous frame of the same channel is displayed. Therefore, any of the images of a plurality of channels subjected to decoding can be displayed at arbitrary positions on the screen.

Thus, in the multichannel video processing unit of FIG. 5, encoded data of images of a plurality of channels can be decoded sequentially for the respective channels by one decoder, and the images of the plurality of channels can be displayed simultaneously at arbitrary positions on one display device.

The decoding performance of the multichannel video processing unit of FIG. 5 is not necessarily so high compared with that of the multichannel video processing unit of FIG. 1, because the decoding of one frame for the three channels should only be finished within one frame period. With no need of high-speed decoding, the hardware of the decoding section can be downsized.

Figure 13A:
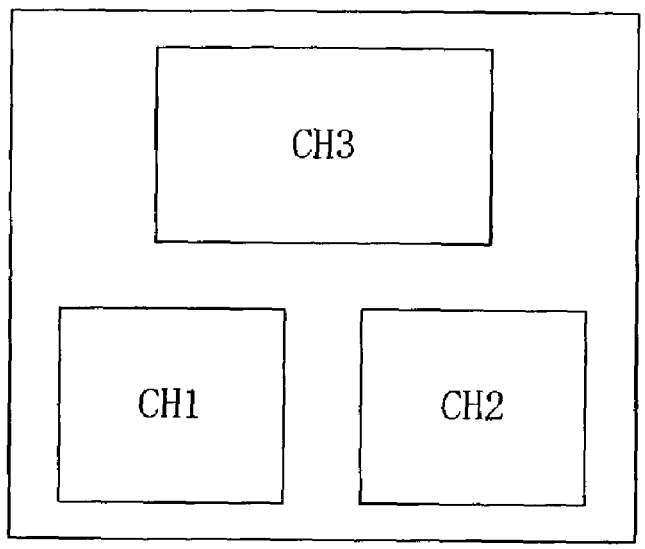
FIG. 13A is an illustration of an example of display in which the screen of channel 3 is longer horizontally than those of the other channels.
Figure 13B:
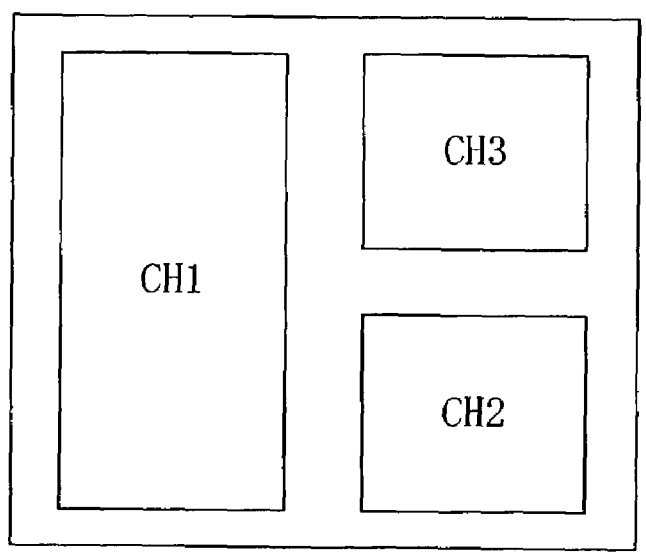
FIG. 13B is an illustration of another example of display in which the screen of channel 1 is longer vertically than those of the other channels.

FIG. 13A illustrates an example of display in which the screen of the channel 3 is longer horizontally than those of the other channels. FIG. 13B illustrates another example of display in which the screen of the channel 1 is longer vertically than those of the other channels. As in these examples, the screen size of some channel may be different from that of another channel.

FIG. 14 is a timing chart demonstrating an example of operation of the multichannel video processing unit of FIG. 5 performed when the channel 2 is frozen.

The decode section 108 performs the processing similar to the processing shown in FIG. 11 until the end of the processing for the (n−1)th frame. As shown in FIG. 14, in the processing for the n-th frame, the decoding section 108 halts the decoding for the channel 2 to be frozen and waits until start of the decoding for the next channel 3. The vertical filtering section 114 performs the processing for the channels in the same order as that of the vertical processing for the (n−1)th frame, which is previous to the frame in which the decoding section 108 halts the processing for the channel 2, not in the order of the decoding for the n-th frame by the decoding section 108.

In other words, the vertical filtering section 114 performs the vertical processing "1_n_1f", "2_n_1f" and "3_n_1f" in this order, not omitting the processing for the channel 2. For the processing for the channel 2 in the frozen state, the vertical filtering section 114 reads data of the frame before the freezing from the decoded video buffer 111. The horizontal filtering section 120 does not omit the horizontal processing for the channel 2, either. The same processing is performed for the (n+1)th and following frames.

As described above, in the multichannel video processing unit of FIG. 5, even in an event that the decoding section halts the processing for some channel to freeze the channel, the processing for the other channels will not be affected by this event. Also, since the vertical processing, the horizontal processing and the output processing are performed for the image of the frozen channel, the image is free to vertical/horizontal size enlargement/reduction and change of the display position.

Figure 15:
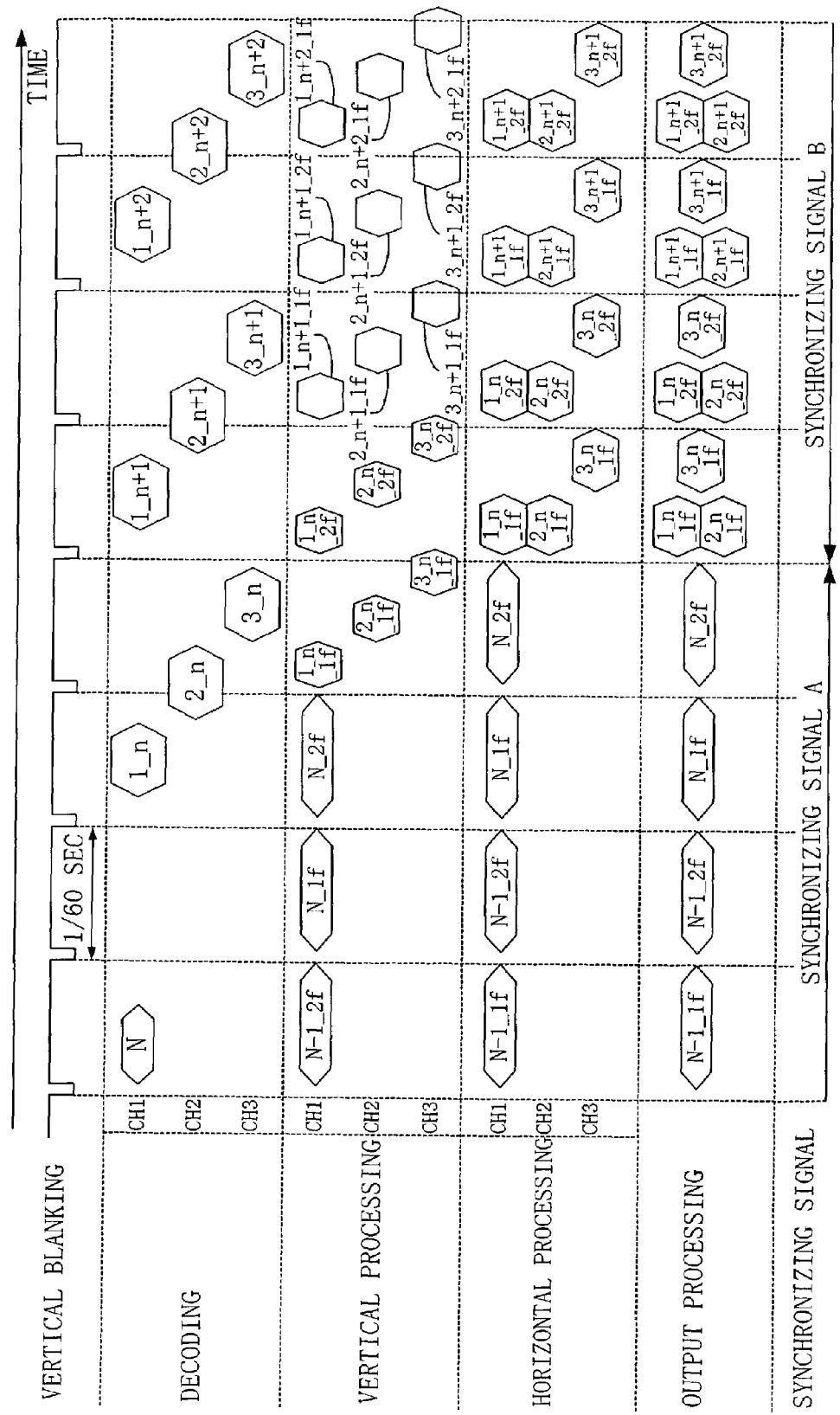
FIG. 15 is a timing chart demonstrating an example of operation of the multichannel video processing unit of FIG. 5 performed when the number of channels to be processed is changed from a single channel to a plurality of channels.

FIG. 15 is a timing chart demonstrating an example of operation of the multichannel video processing unit of FIG. 5 in which the number of channels to be processed is changed from a single channel to a plurality of channels.

In FIG. 15, it is assumed that the multichannel video processing unit of FIG. 5 operates based on a synchronizing signal for the channel 1, and that the system control section 124 sends an instruction designating the number of channels to be processed of "1" to the decoding section 108, the vertical filtering section 114, the horizontal filtering section 120 and the output processing section 122. It is also assumed that the multichannel video processing unit changes the number of channels to be processed from the single channel to a plurality of channels after the processing of the N-th frame of the channel 1 (N is an integer and N=n−1 in FIG. 15).

When encoded data of the channel 1 is stored in the stream buffer 104, the decoding section 108 reads the encoded data of the channel 1 from the stream buffer 104 and performs decoding "N" for the N-th frame. The decoding section 108 sends the decoded data to the decoded video buffer 110 for storage.

The vertical filtering section 114 reads the decoded data from the decoded video buffer 110 after receiving the first and second vertical synchronizing signals from the start of the decoding "N", to perform vertical processing "N_1f" and "N_2f", respectively. The vertical filtering section 114 sends the resultant vertically-processed data to the video vertical buffer 116 for storage.

The horizontal filtering section 120 reads the vertically-processed data from the video vertical buffer 116 after the next and the second next vertical blanking intervals from the start of the vertical processing "N_1f", to perform horizontal processing "N_1f" and "N_2f", respectively. The horizontal filtering section 120 outputs the resultant horizontally-processed data to the output processing section 122. The output processing section 122 generates a video signal based on the input data and outputs the generated signal.

Once the decoding "N" is finished, the system control section 124 changes the number of channels to be processed, and sends an instruction designating the changed number of channels of "3" to the decoding section 108. The system control section 124 instructs the decoding section 108 to perform decoding "1_n", "2_n" and "3_n" for the plurality of channels sequentially after receiving the second vertical synchronizing signal from the start of the decoding "N".

Once the vertical processing "N_2f" is finished, the system control section 124 sends the instruction designating the changed number of channels of "3" to the vertical filtering section 114. The system control section 124 instructs the vertical filtering section 114 to perform vertical processing "1_n_1f", "2_n_1f" and "3_n_1f" for the plurality of channels sequentially after receiving the next vertical synchronizing signal from the start of the decoding "1_n" by the decoding section 108.

Once the horizontal processing "N_2f" is finished, the system control section 124 sends the instruction designating the changed number of channels of "3" to the horizontal filtering section 120. The system control section 124 instructs the horizontal filtering section 120 to perform horizontal processing "1_n_1f", "2_n_1f" and "3_n_1f"

for the plurality of channels after the next vertical blanking interval from the start of the vertical processing "1_n__1f" by the vertical filtering section 114.

The same processing is repeated for the subsequent fields by the decoding section 108, the vertical filtering section 114 and the horizontal filtering section 120.

The multichannel video processing unit of FIG. 5 operates in synchronization with a synchronizing signal A until before the start of the next field from the start of the processing for the plurality of channels by the vertical filtering section 114, and thereafter in synchronization with a synchronizing signal B. The synchronizing signal A refers to the vertical synchronizing signal and the horizontal synchronizing signal for display of a single channel (channel 1), while the synchronizing signal B refers to the vertical synchronizing signal and the horizontal synchronizing signal for display of the plurality of channels (channels 1 to 3). The synchronizing signals A and B are in synchronization with each other.

The video signals output from the multichannel video processing unit of FIG. 5 for display of the plurality of channels and display of a single channel may be either of a high definition television (HDTV) signal and a standard definition television (SDTV) signal.

Thus, the multichannel video processing unit of FIG. 5 can sequentially output undisturbed images, without the necessity of stopping the video output, even in the event of changing the number of channels to be processed from a single channel to a plurality of channels.

Figure 16:
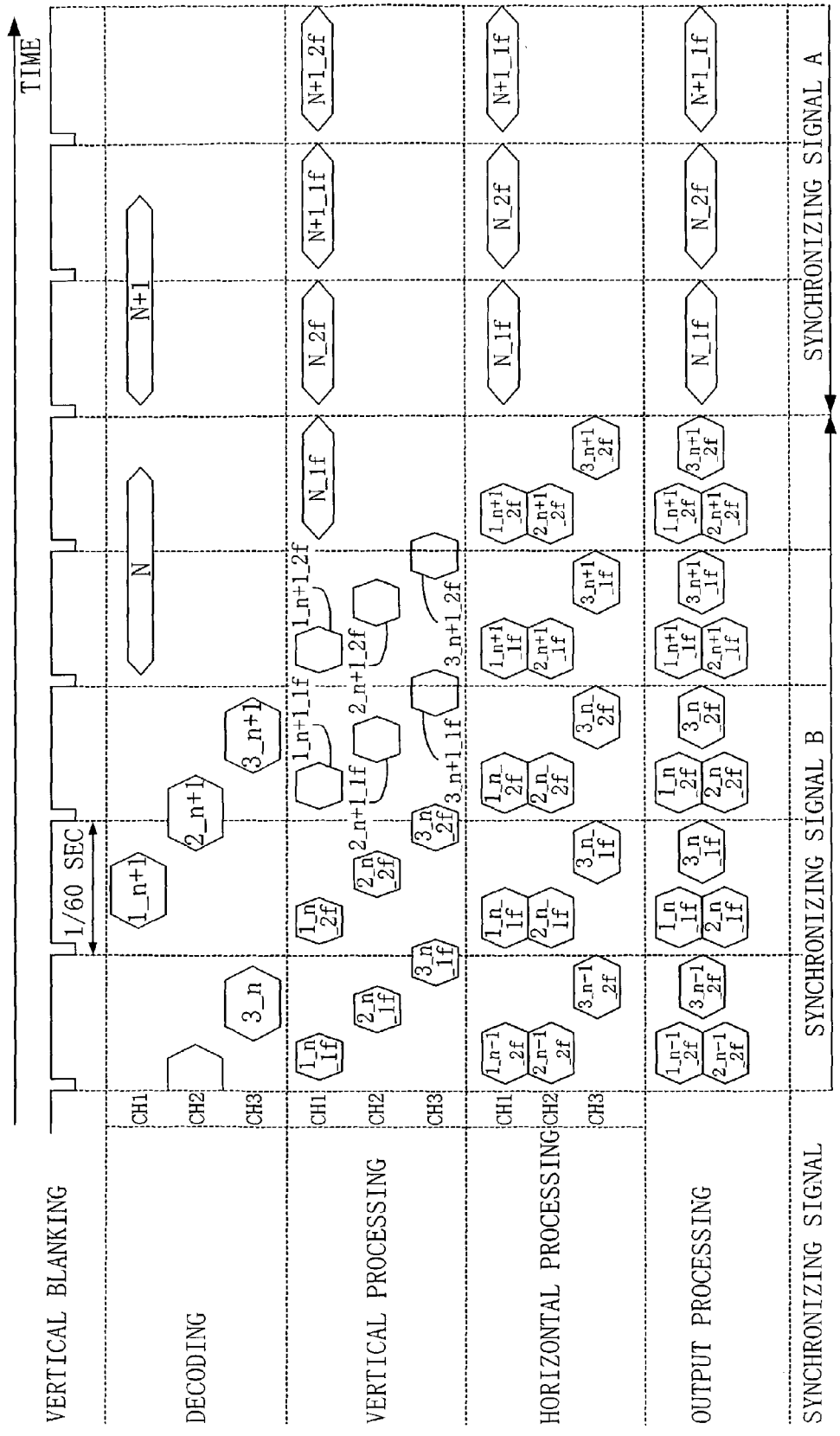
FIG. 16 is a timing chart demonstrating an example of operation of the multichannel video processing unit of FIG. 5 performed when the number of channels to be processed is changed from a plurality of channels to a single channel.

FIG. 16 is a timing chart demonstrating an example of operation of the multichannel video processing unit of FIG. 5 in which the number of channels to be processed is changed from a plurality of channels to a single channel.

In FIG. 16, it is assumed that the multichannel video processing unit of FIG. 5 operates based on the synchronizing signal for a plurality of channels, and that the system control section 124 sends an instruction designating the number of channels to be processed of "3" to the decoding section 108, the vertical filtering section 114, the horizontal filtering section 120 and the output processing section 122. It is also assumed that the multichannel video processing unit changes the number of channels to be processed from a plurality of channels to a single channel after the processing of the (n+1)th frame for the channels 1 to 3. In FIG. 16, N=n+2.

The decoding section 108 sequentially performs decoding "1_n+1", "2_n+1" and "3_n+1" for the (n+1)th frame. The vertical filtering section 114 performs vertical processing "1_n+1__1f" and the like and processing "1_n+1__2f" and the like after receiving the next and second next vertical synchronizing signals from the decoding "1_n+1", respectively. The horizontal filtering section 120 performs horizontal processing "1_n+1__1f" and the like and processing "1_n+1__2f" and the like after the next and second next vertical blanking intervals from the vertical processing "1_n+1__1f", respectively. The horizontal filtering section 120 outputs the resultant horizontally-processed data to the output processing section 122. The output processing section 122 generates a video signal by synthesizing the input data and outputs the generated signal.

Once the decoding "3_n+1" is finished, the system control section 124 changes the number of channels to be processed, and sends an instruction designating the changed number of channels of "1" to the decoding section 108. The system control section 124 instructs the decoding section 108 to perform decoding "N" for the channel 1 after receiving the second vertical synchronizing signal from the start of the decoding "1_n+1".

Once the vertical processing "3_n+1__2f" is finished, the system control section 124 sends the instruction designating the changed number of channels of "1" to the vertical filtering section 114. The system control section 124 instructs the vertical filtering section 114 to perform vertical processing "N__1f" for the channel 1 after receiving the next vertical synchronizing signal from the start of the decoding "N" by the decoding section 108.

Once the horizontal processing "3_n+1__2f" is finished, the system control section 124 sends the instruction designating the changed number of channels of "1" to the horizontal filtering section 120. The system control section 124 instructs the horizontal filtering section 120 to perform horizontal processing "N__1f" for the channel 1 after the next vertical blanking interval from the start of the vertical processing "N__1f" by the vertical filtering section 114.

The same processing is repeated for the subsequent fields by the decoding section 108, the vertical filtering section 114 and the horizontal filtering section 120.

The multichannel video processing unit of FIG. 5 operates in synchronization with the synchronizing signal B until before the start of the next field from the start of the processing for the channel 1 only by the vertical filtering section 114, and thereafter in synchronization with the synchronizing signal A. The definition of the synchronizing signals A and B are the same as that described above with reference to FIG. 15, and the synchronizing signals A and B are in synchronization with each other.

Thus, the multichannel video processing unit of FIG. 5 can sequentially output undisturbed images, without the necessity of stopping the video output, even in the event of changing the number of channels to be processed from a plurality of channels to a single channel.

(First Alteration to Embodiment 2)

Figure 17:
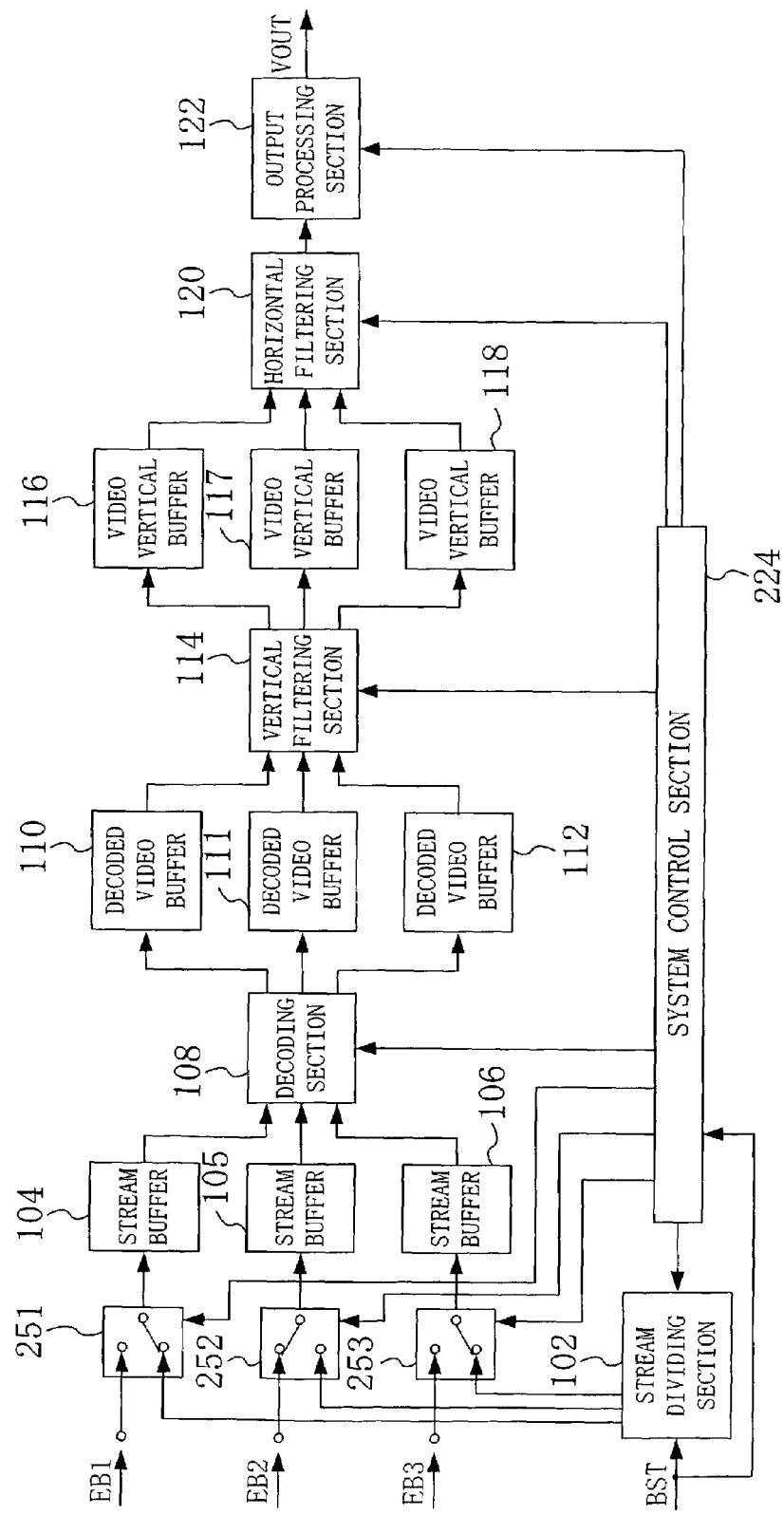
FIG. 17 is a block diagram of a multichannel video processing unit of the first alteration to Embodiment 2 of the present invention.

FIG. 17 is a block diagram of a multichannel video processing unit of the first alteration to Embodiment 2 of the present invention. The multichannel video processing unit of FIG. 17 includes selectors 251, 252 and 253 in addition to the components of the multichannel video processing unit of FIG. 5, and includes a system control section 224 in place of the system control section 124. The other components are the same as those described with reference to FIG. 5.

The stream dividing section 102 outputs divided bit streams of respective channels to the selectors 251 to 253. Bit streams EB1, EB2 and EB3 including encoded data of images of the respective channels are also input into the selectors 251, 252 and 253, respectively, from outside of the multichannel video processing unit of FIG. 17. Each of the selectors 251 to 253 selects either one of the two input bit streams according to an instruction from the system control section 224, and outputs the selected one to the corresponding one of the stream buffers 104 to 106.

In the illustrated example of FIG. 17, the selectors 251 and 253 select and output the bit stream from the stream dividing section 102 while the selector 252 selects and outputs the external bit stream EB2. By this selection, an image of the bit stream different from the bit stream BST supplied to the stream dividing section 102 can be displayed as the image of the channel 2.

As described above, in the multichannel video processing unit of FIG. 17, it is possible to display a combination of images of arbitrary channels, each selected from a bit stream of encoded data of images of a plurality of channels in the time-division multiplexed state and a bit stream supplied from other equipment as an external input.

(Second Alteration to Embodiment 2)

Figure 18:
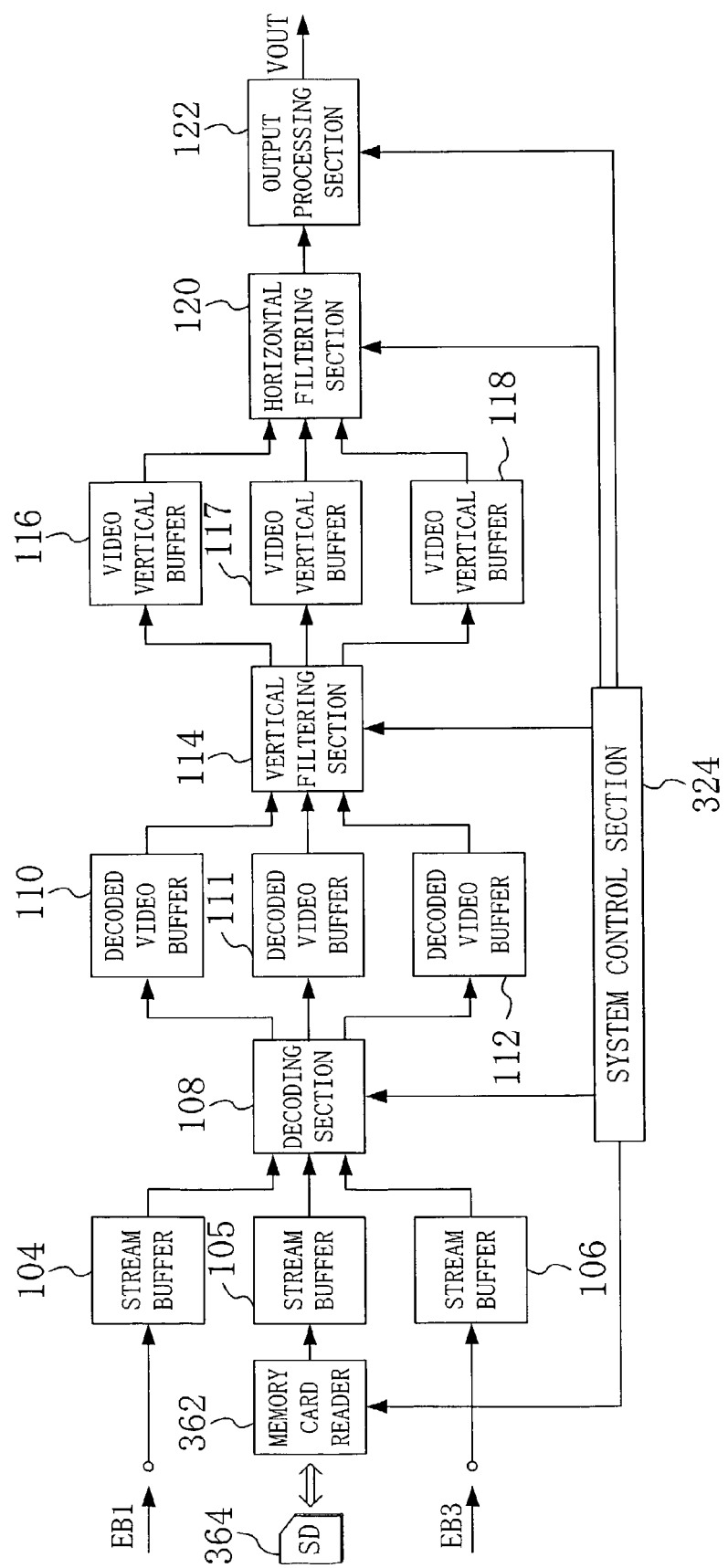
FIG. 18 is a block diagram of a multichannel video processing unit of the second alteration to Embodiment 2 of the present invention.

FIG. 18 is a block diagram of a multichannel video processing unit of the second alteration to Embodiment 2 of the present invention. The multichannel video processing unit of FIG. 18 includes a memory card reader 362 and a system control section 324 in place of the stream dividing section 102 and the system control section 124 of the multichannel video processing unit of FIG. 5.

Bit streams EB1 and EB3 are input into the stream buffers 104 and 106, respectively, from outside of the multichannel video processing unit of FIG. 18. The memory card reader 362 reads data stored in a removable memory card 364 according to an instruction from the system control section 324, and outputs the read data to the stream buffer 105 as a bit stream. The memory card 364 may be a secure digital (SD) memory card, a CompactFlash card, a SmartMedia card or the like, for example. The memory card 364 may otherwise be embedded in the multichannel video processing unit of FIG. 18.

As described above, the multichannel video processing unit of FIG. 18 can read data stored in a memory card and display the data together with images obtained from other bit streams.

In the embodiments described above, the video signal output from the multichannel video processing unit is supplied to a display device such as a CRT. Alternatively, the video signal may be recorded in a VTR or any of other types of recorders. Otherwise, the video signal may be supplied to a computer to be displayed on the display of the computer. In this case, images of a plurality of channels may be displayed in one of windows on the display.

The processing by the multichannel video processing unit described above may be implemented by software using a CPU.

The function of the system control section may be incorporated in the stream dividing section, the decoding section, the vertical filtering section, the horizontal filtering section and the output processing section.

The multichannel video processing unit and method of the present invention are also adaptable for processing of bit streams and the like read from recording media such as a digital versatile disc (DVD), a compact disc (CD) and a hard disk.

As described above, according to the present invention, it is possible to realize a multichannel video processing unit and method capable of decoding encoded data of images for a plurality of channels to generate a signal for displaying the images of the plurality of channels. Images of a plurality of channels can be decoded by one decoder, and thus cost reduction is possible. In addition, images of any channels can be displayed at arbitrary positions without the necessity of having so high decoding performance, and thus further cost reduction is possible.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A multichannel video processing unit comprising:
a decoding section for sequentially selecting a bit stream from a plurality of bit streams each including encoded data of an image of one channel, decoding the selected bit stream by one frame each, and outputting resultant decoded data;
a vertical filtering section for sequentially selecting a channel from a plurality of channels corresponding to the images decoded by the decoding section, performing vertical processing for the decoded data corresponding to the selected channel, and outputting resultant vertically-processed data;
a horizontal filtering section for sequentially selecting a channel from the plurality of channels according to the position at which the image is to be displayed, performing horizontal processing for the vertically-processed data corresponding to the selected channel, and outputting resultant horizontally-processed data; and
an output processing section for generating a video signal for display of images of a plurality of channels by synthesizing the horizontally-processed data and outputting the generated video signal,
wherein the vertical filtering section starts the processing for one frame after receiving the next vertical synchronizing signal from the start of the processing for the frame by the decoding section, and
the horizontal filtering section and the output processing section start the processing for the frame after the next vertical blanking interval from the start of the processing for the frame by the vertical filtering section, and
wherein the order of the channels to be processed for a frame by the vertical filtering section is the same as the order in the processing for the same frame by the decoding section.

2. The unit of claim 1, wherein the decoding section starts the processing for the next frame after the vertical filtering section has performed the processing for one slice or more of the second field of the current frame.

3. The unit of claim 1, wherein the vertical filtering section starts the processing for the next channel after a time obtained by dividing the interval of the vertical synchronizing signal by the number of the plurality of channels has passed from the start of the processing for the current channel.

4. The unit of claim 1, wherein the vertical filtering section terminates the processing for a channel when a time obtained by dividing the interval of the vertical synchronizing signal by the number of the plurality of channels has passed from the start of the processing for the channel.

5. The unit of claim 1, wherein the output processing section comprises output circuits corresponding to respective channels for images to be displayed on a same line, and
each of the output circuits stores the horizontally-processed data of the corresponding channel among the channels for images to be displayed on a line to be processed.

6. The unit of claim 5, wherein the output processing section synthesizes outputs of those among the output circuits storing data of the channels for the images to be displayed on the line to be processed, and outputs the synthesized data.

7. The unit of claim 1, wherein when the decoding section halts the processing for some of the channels, the vertical filtering section performs the vertical processing in the same order of the channels as that in which the vertical filtering section has performed the processing for the frame previous to the frame in which the decoding section halts the processing for some of the channels.

8. The unit of claim 1, wherein when the number of channels to be processed is changed,
   the decoding section performs the decoding for the changed number of channels,
   the vertical filtering section performs the vertical processing for the changed number of channels after receiving the next vertical synchronizing signal from the start of the decoding for the changed number of channels by the decoding section, and
   the horizontal filtering section performs the horizontal processing for the changed number of channels after the next vertical blanking interval from the start of the vertical processing for the changed number of channels by the vertical filtering section.

9. The unit of claim 8, wherein the multichannel video processing unit operates in synchronization with a synchronizing signal prepared for display of images obtained after the change of the number of channels to be processed, from the time at which the next field is started after the start of the vertical processing for the changed number of channels by the vertical filtering section.

10. The unit of claim 1, wherein the output processing section generates a video signal for displaying images of the plurality of channels lined in the horizontal direction.

11. The unit of claim 1, wherein the output processing section generates a video signal for displaying a plurality of screens, and at least one of the plurality of screens is different in size from the other screens.

12. A multichannel video processing method comprising the steps of:
    decoding a bit stream including sequentially selecting a bit stream from a plurality of bit streams each including encoded data of an image of one channel, and decoding the selected bit stream by one frame each to obtain decoded data;
    performing vertical filtering including sequentially selecting a channel from a plurality of channels corresponding to the images decoded in the step of decoding, and performing vertical filtering for the decoded data corresponding to the selected channel to obtain vertically-processed data;
    performing horizontal filtering including sequentially selecting a channel from the plurality of channels according to the position at which the image is to be displayed, and performing horizontal filtering for the vertically-processed data corresponding to the selected channel to obtain horizontally-processed data; and
    performing output processing including generating a video signal for display of images of a plurality of channels by synthesizing the horizontally-processed data,
    wherein in the step of performing vertical filtering, the processing for one frame is started after receiving the next vertical synchronizing signal from the start of the processing for the frame by the decoding section, and
    in the step of performing horizontal filtering and the step of performing output processing, the processing for the frame is started after the next vertical blanking interval from the start of the processing for the frame in the step of performing vertical filtering, and
    wherein the order of the channels to be processed in the step of performing vertical filtering is the same as the order in the processing for the same frame in the step of decoding.

13. The method of claim 12, wherein in the step of decoding, the processing for the next frame is started after the processing for one slice or more of the second field of the current frame in the step of vertical filtering.

14. The method of claim 12, wherein in the step of vertical filtering, the processing for the next channel is started after a time obtained by dividing the interval of the vertical synchronizing signal by the number of the plurality of channels has passed from the start of the processing for the current channel.

15. The method of claim 12, wherein in the step of vertical filtering, the processing for a channel is terminated when a time obtained by dividing the interval of the vertical synchronizing signal by the number of the plurality of channels has passed from the start of the processing for the channel.

16. The method of claim 12, wherein in the step of performing output processing, the horizontally-processed data corresponding to channels for images to be displayed on a line to be processed is synthesized.

17. The method of claim 12, wherein when the processing for some of the channels is halted in the step of decoding, the vertical processing in the step of performing vertical filtering is performed in the same order of the channels as that in which the processing for the frame previous to the frame in which the decoding section halts the processing for some of the channels in the step of decoding has been performed in the step of performing vertical filtering.

18. The method of claim 12, wherein when the number of channels to be processed is changed,
    in the step of decoding, the decoding for the changed number of channels is performed,
    in the step of performing vertical filtering, the vertical processing for the changed number of channels is performed after receiving the next vertical synchronizing signal from the start of the decoding for the changed number of channels in the step of decoding, and
    in the step of horizontal filtering, the horizontal processing for the changed number of channels is performed after the next vertical blanking interval from the start of the vertical processing for the changed number of channels in the step of performing vertical filtering.

19. The method of claim 18, wherein operation is performed in synchronization with a synchronizing signal prepared for display of images obtained after the change of the number of channels to be processed, from the time at which the next field is started after the start of the vertical processing for the changed number of channels in the step of performing vertical filtering.

20. The method of claim 12, wherein the step of performing output processing comprises generating a video signal for displaying images of the plurality of channels lined in the horizontal direction.

21. The method of claim 12, wherein the step of performing output processing comprises generating a video signal for displaying a plurality of screens, and at least one of the plurality of screens is different in size from the other screens.

* * * * *